Dec. 4, 1945.   P. E. PEARSON ET AL   2,390,457
APPARATUS FOR SPRAYING CONTAINER PARTS
Filed May 7, 1942   12 Sheets-Sheet 2

Inventors
Paul E. Pearson
A. Treff
By Mason, Porter & Diller
Attorneys

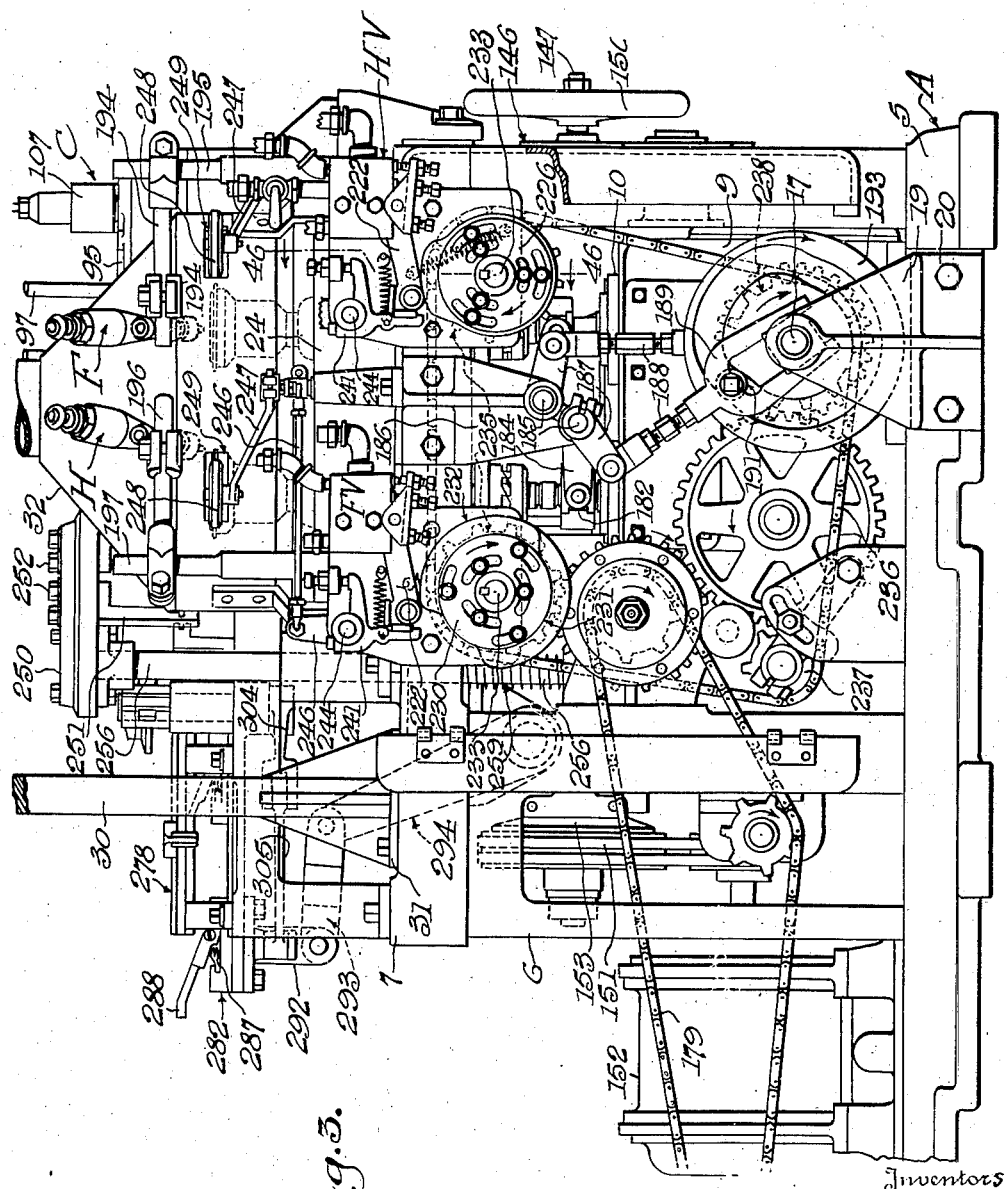

Dec. 4, 1945. P. E. PEARSON ET AL 2,390,457
APPARATUS FOR SPRAYING CONTAINER PARTS
Filed May 7, 1942 12 Sheets-Sheet 4
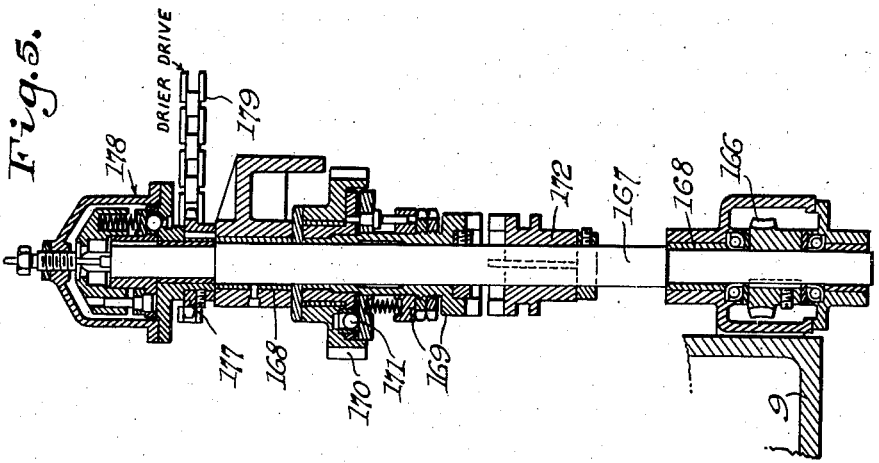
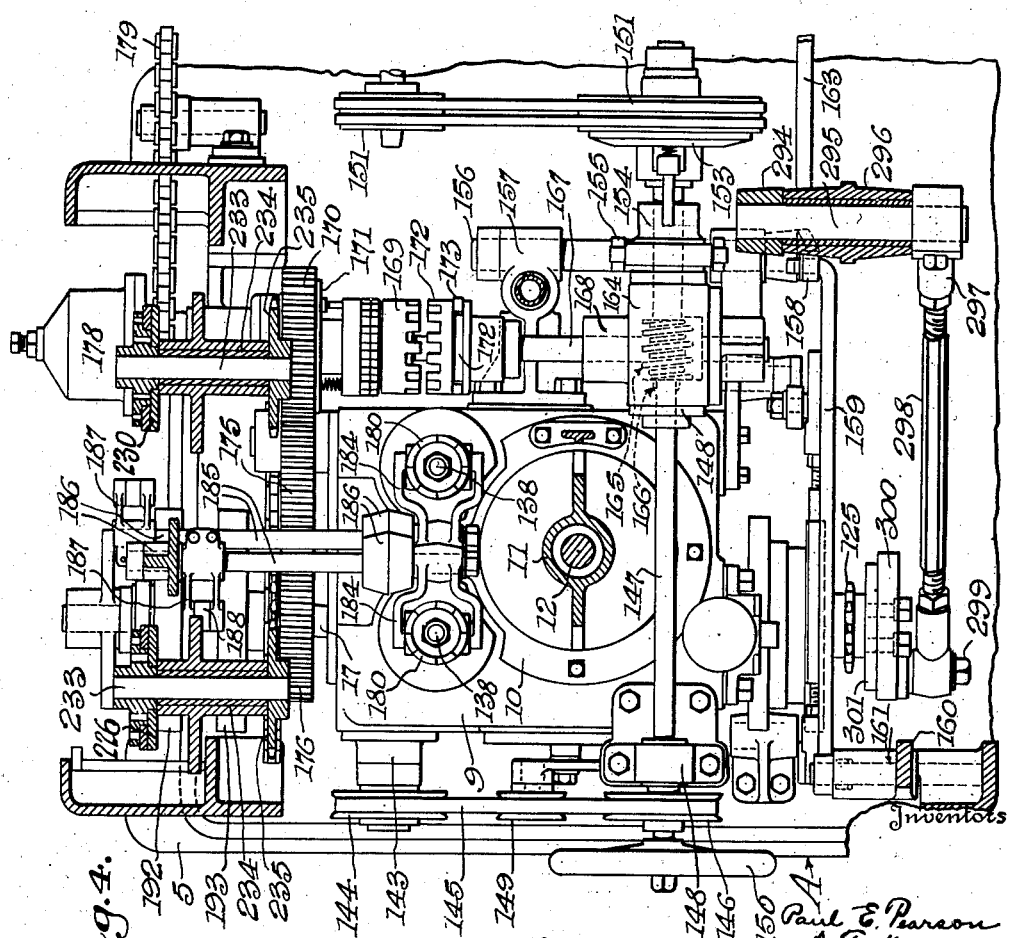

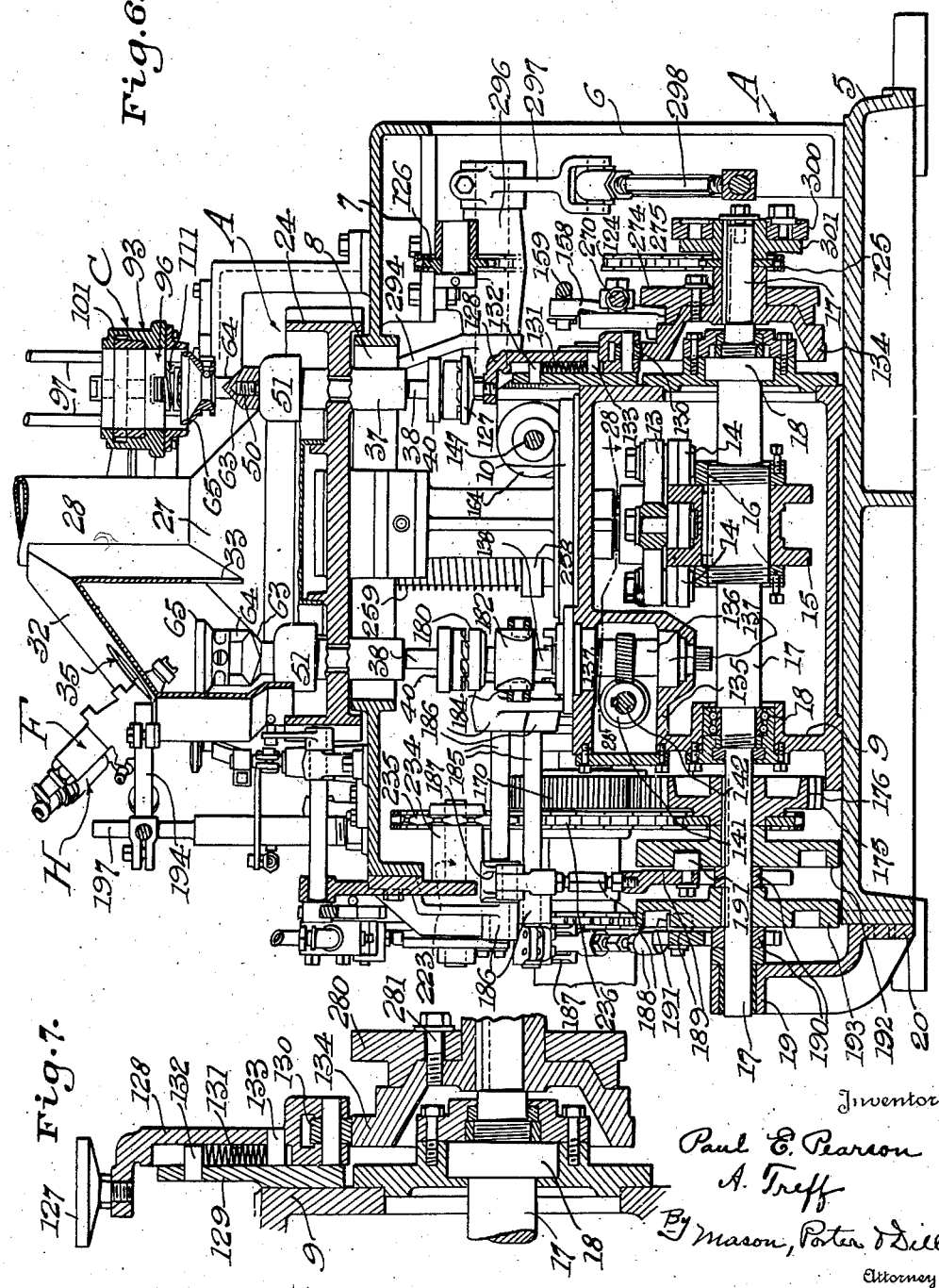

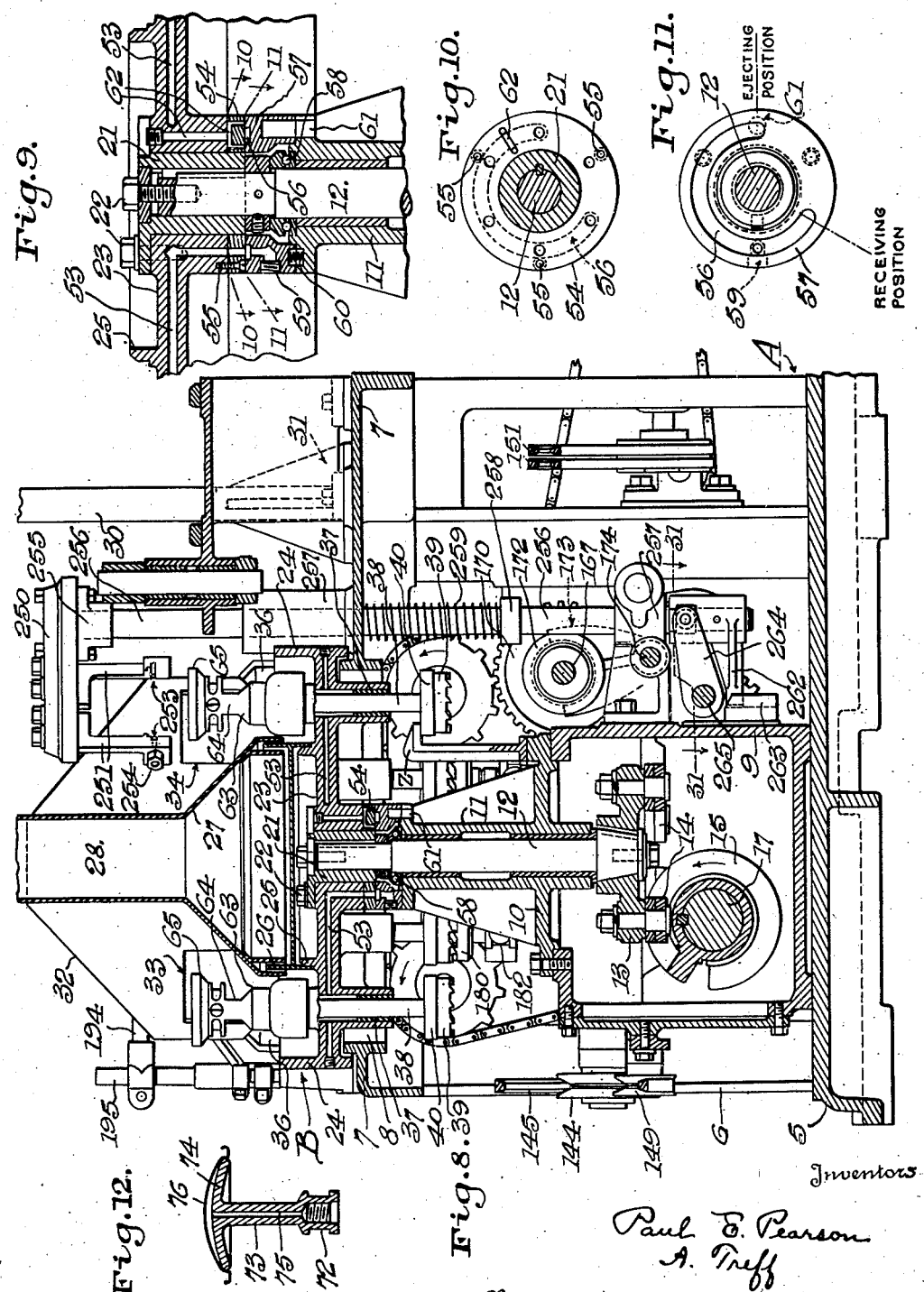

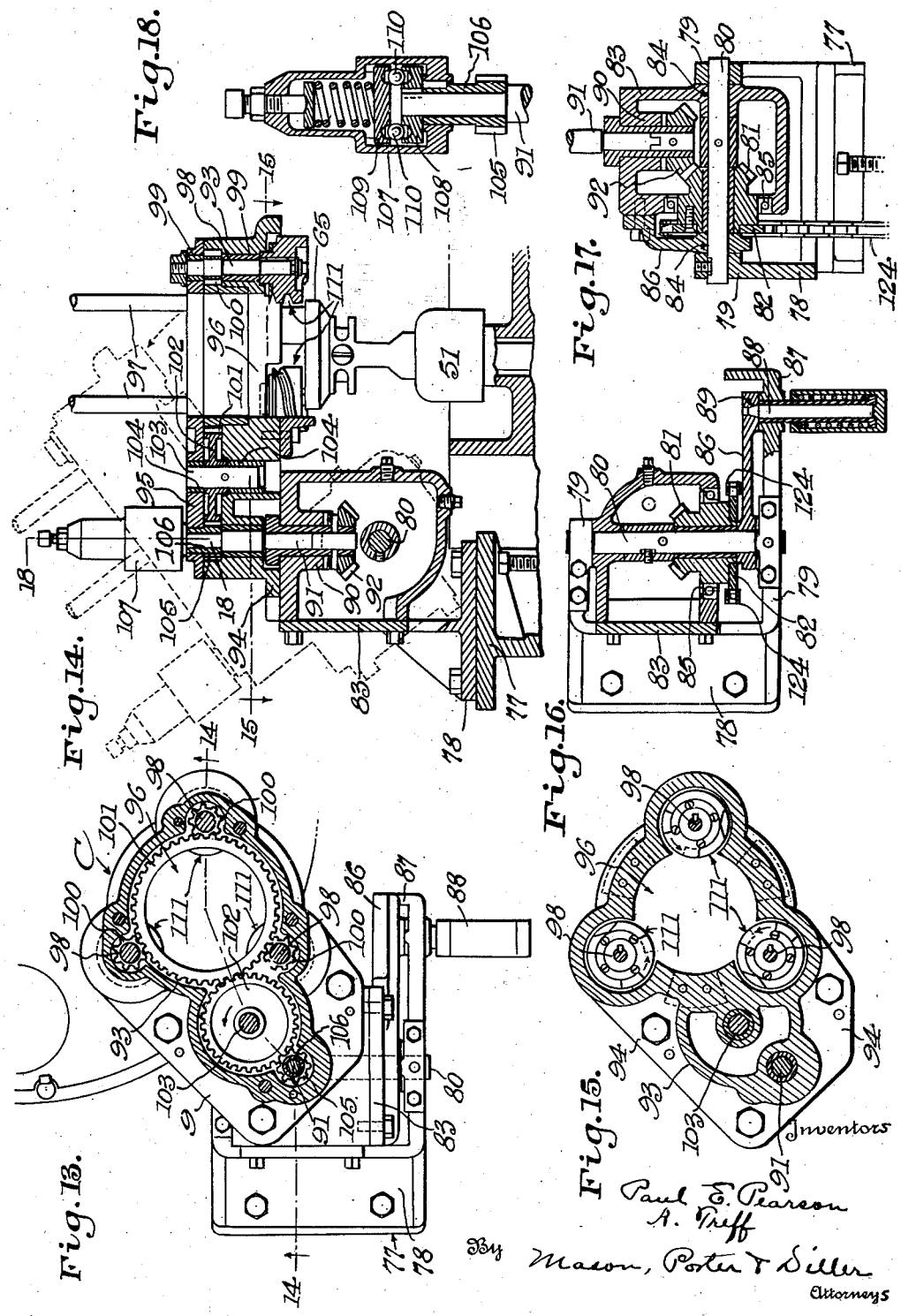

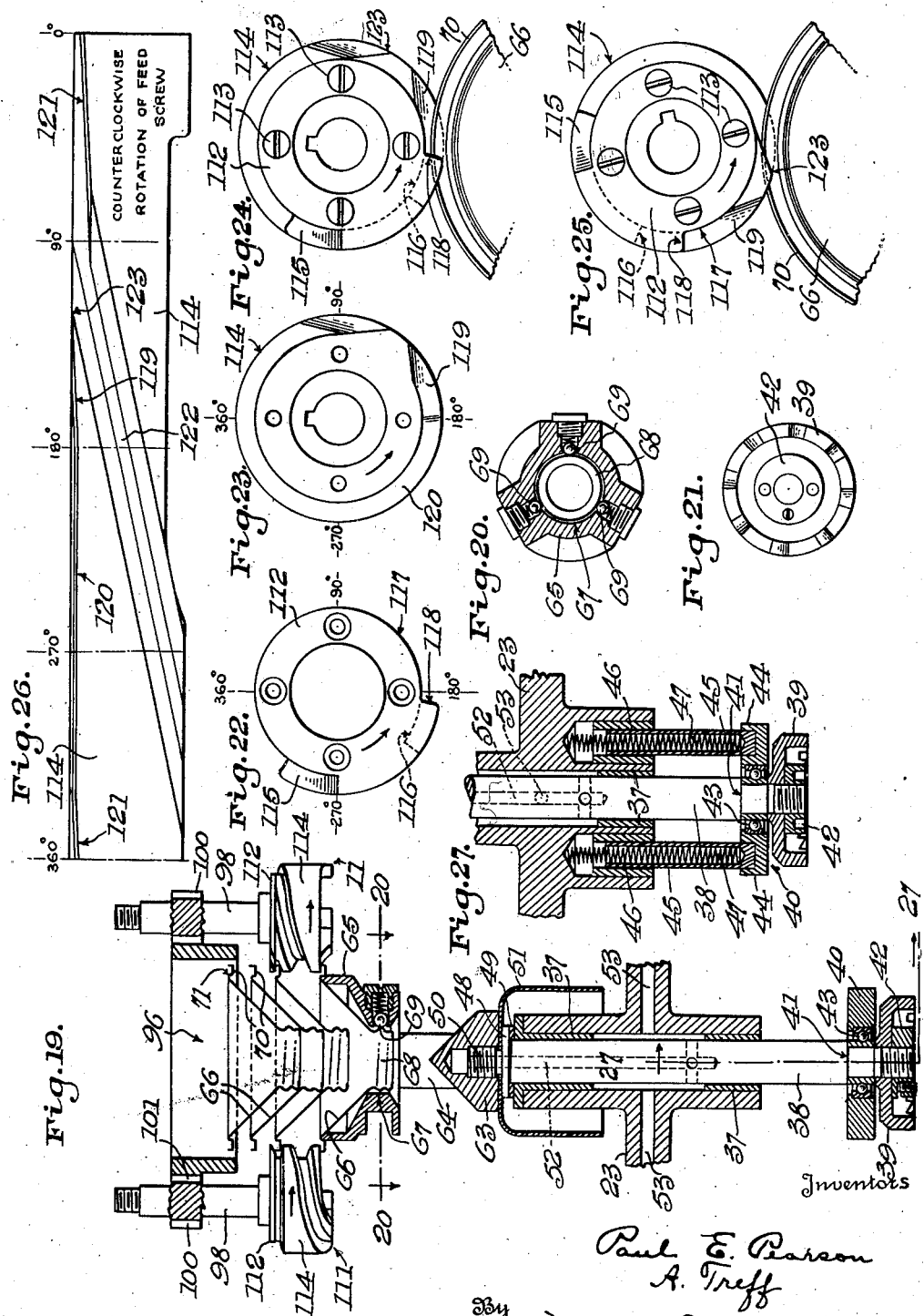

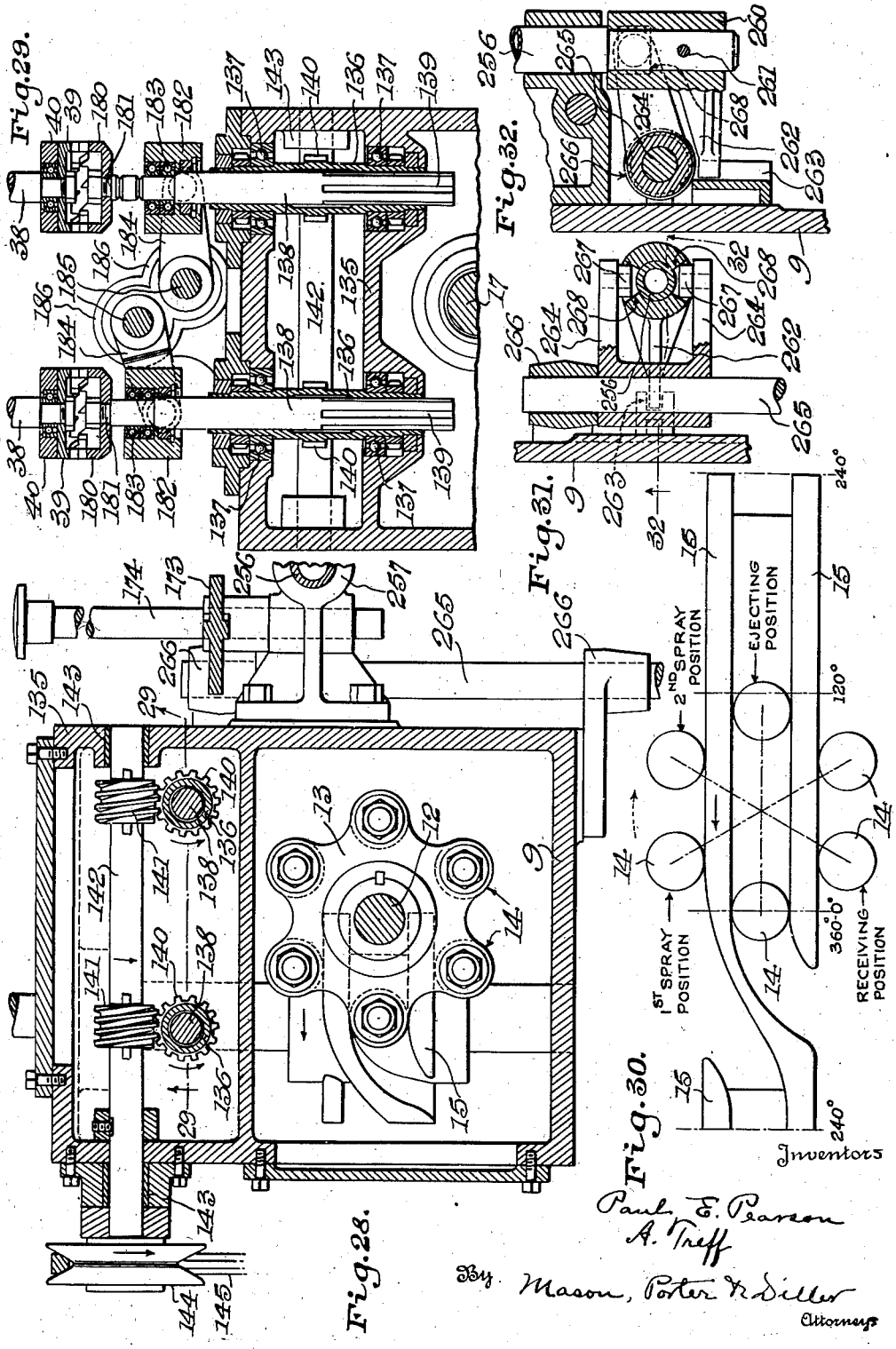

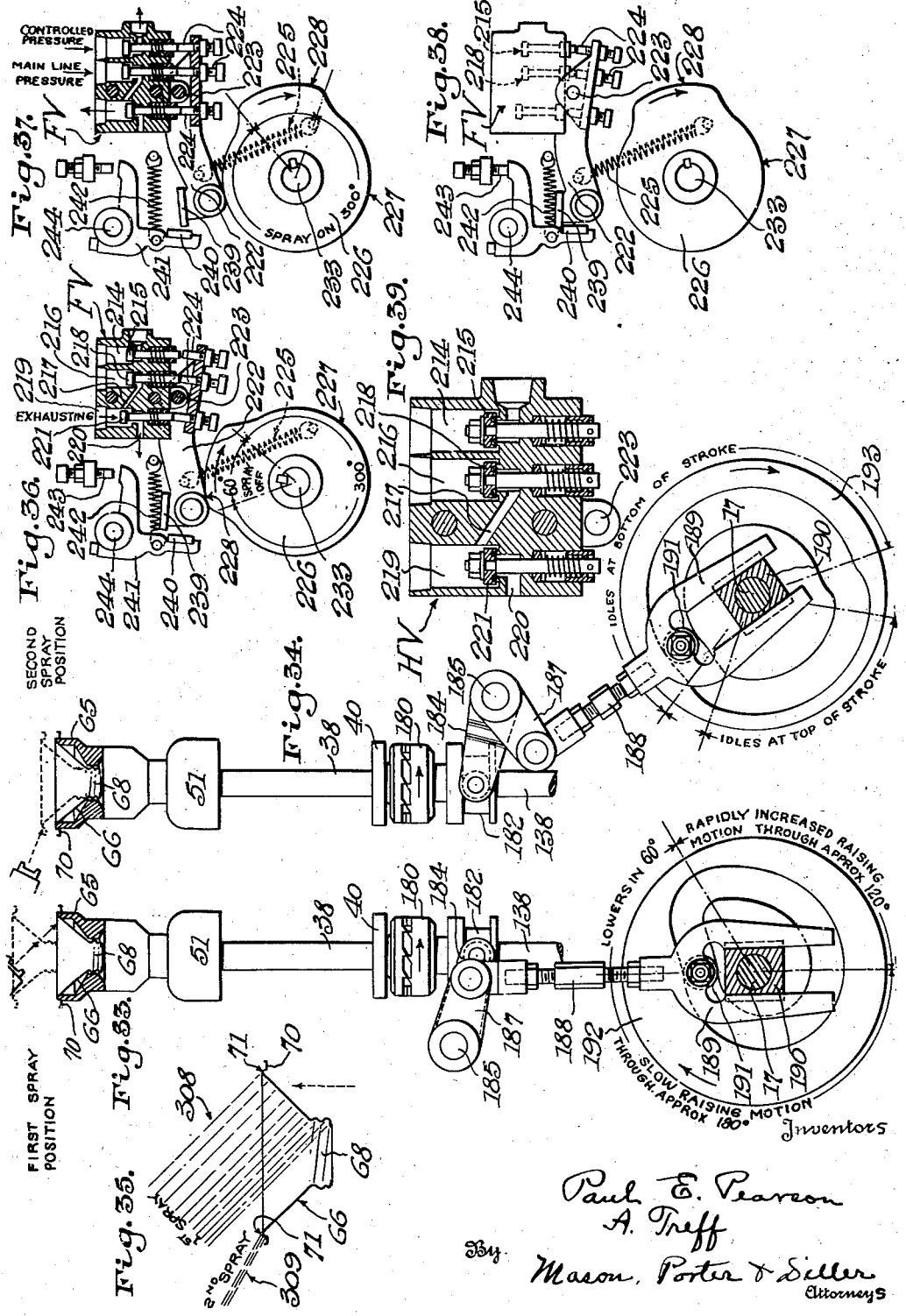

Dec. 4, 1945. P. E. PEARSON ET AL 2,390,457
APPARATUS FOR SPRAYING CONTAINER PARTS
Filed May 7, 1942 12 Sheets-Sheet 11
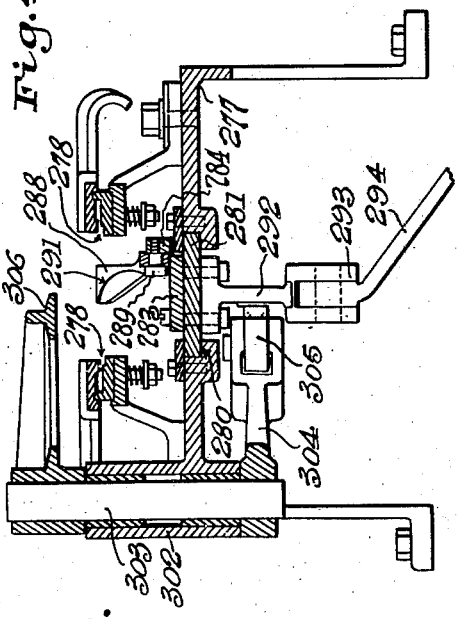
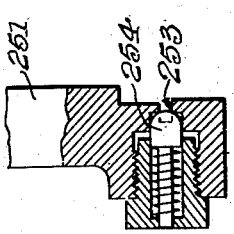
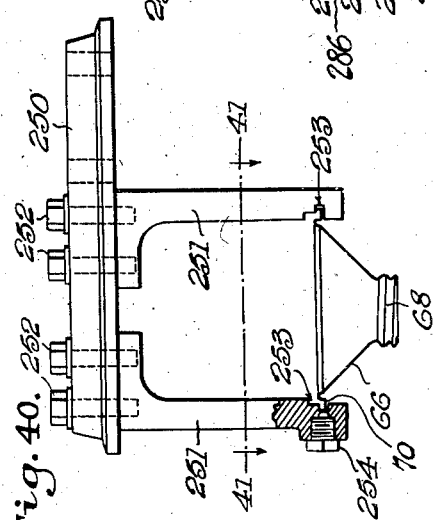
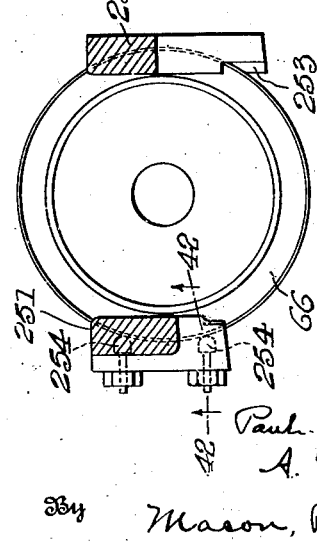
Inventors
Paul E. Pearson
A. Treff
By Mason, Porter & Diller
Attorneys

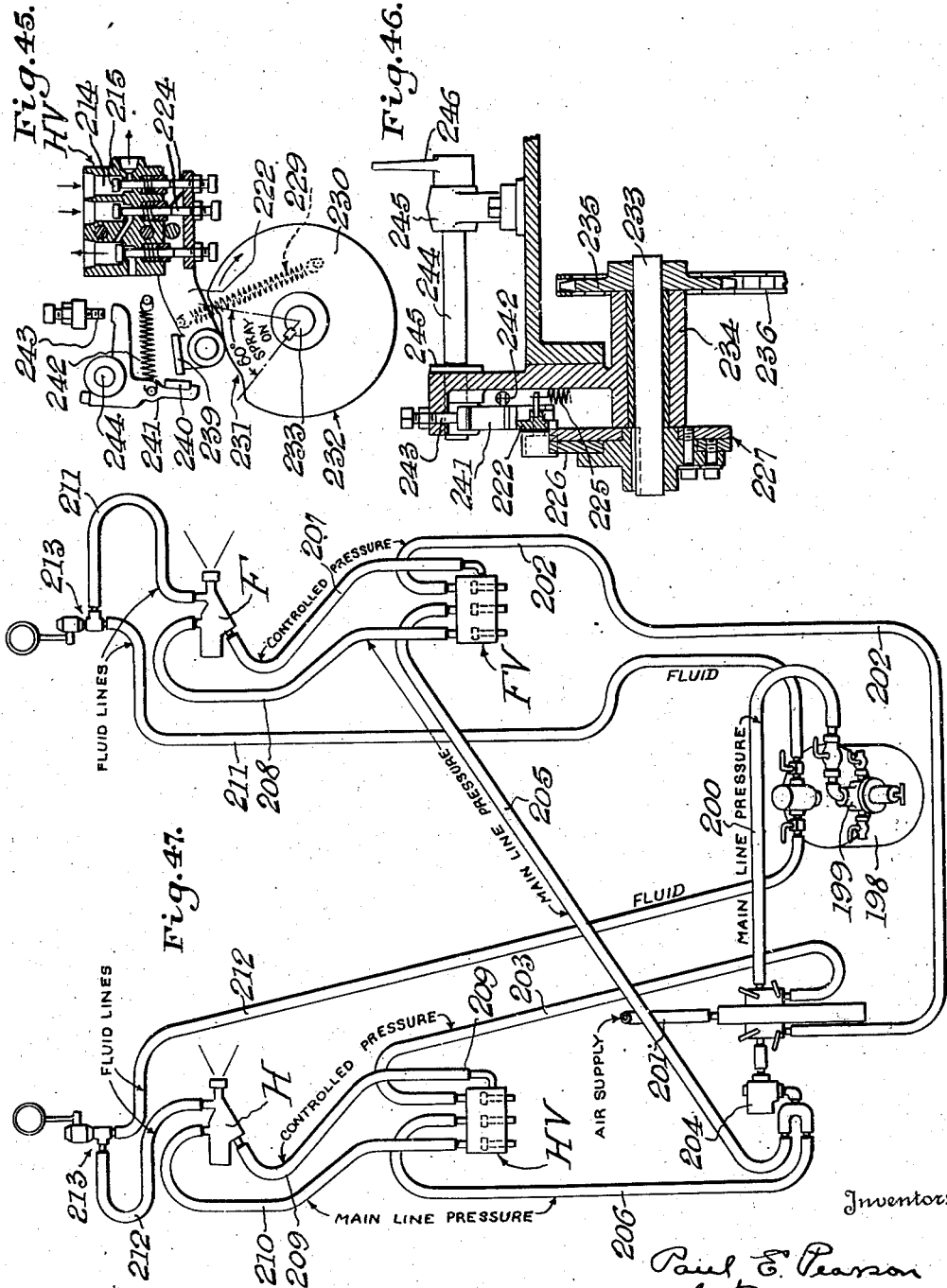

Patented Dec. 4, 1945

2,390,457

UNITED STATES PATENT OFFICE 2,390,457

APPARATUS FOR SPRAYING CONTAINER PARTS

Paul E. Pearson and Alfred Treff, Chicago, Ill., assignors to Continental Can Company, Inc., New York, N. Y., a corporation of New York Application May 7, 1942, Serial No. 442,090

40 Claims. (Cl. 91—45)

The invention relates generally to coating apparatus and primarily seeks to provide a novel machine structure in which the cone tops intended to be assembled on can bodies can be rapidly and efficiently given an interior protective coating which is of uniform thickness despite the coniform shape of the cone tops.

In the spray coating of containers or like articles the method of rotating the articles while applying a spray coating to surfaces thereof has been commonly practiced but these articles have had surface areas which were so shaped that no difficult problems have been presented in applying to these surfaces a coating of satisfactory uniform thickness. When it is attempted to coat articles of irregular shape and varying diameters, such as the cone tops which are commonly affixed to the upper ends of certain forms of containers, difficult problems are presented in attempting to apply coatings of uniform thickness at all portions of the coniform surfaces. When it is attempted to spray such coniform surfaces in the usual manner of directing a concentrated spray from a stationary spray nozzle onto a small area of a surface being moved relatively to the nozzle, or from a moving spray nozzle onto a stationary surface, it is impossible to move the spray longitudinally at a uniform rate relative to the axis of the rotating cone, or to move the rotating cone at a uniform rate in the direction of its axis relative to a stationary spray, because when it is attempted to do so the all over surface coating resulting from the merging of the spirally applied concentrated spray will be non-uniform in thickness, said coating increasing in thickness toward the small diameter mouth portion of the cone top because of the gradually decreasing area provided at that portion of the cone top on which to receive the spray coating being applied at a uniform rate.

Therefore, it is a primary object of the present invention to provide a novel apparatus for spraying cone tops embodying means for presenting a cone top means for and the coating applying spray in cooperative relation, imparting rotation to the cone tops, and means for bringing about relative movement between the cone top and the spray for causing the spray to move along the axis of the rotating cone top, or the cone top to move in the direction of its axis relative to the spray, at gradually increasing speed as the mouth or small diameter portion of the cone top is approached by the spray, thereby to cause the all over surface coating resulting from the merging of the concentrated spray thus spirally applied to be of uniform thickness throughout the interior surface of the cone top.

Another object of the invention is to provide a machine or apparatus of the character stated including a turret having thereon a plurality of rotatable chuck spindles, a chuck on each spindle for removably holding a cone top in position to be sprayed, a cone top body spraying station, a cone top heel spraying station, means for indexing the turret to successively present the chucks at a cone top receiving station, at the two spraying stations, and at a sprayed cone top discharging station, means at the receiving station for feeding and applying cone tops to the chucks, means at the respective spraying stations for imparting rotation to the chucks and cone tops and for imparting lifting and lowering movement to the chucks and cone tops relative to the spraying means to provide for the uniform coating of the cone tops, and means at the discharging station for discharging the sprayed cone tops.

Another object of the invention is to provide a machine structure of the character stated including interchangeable chuck sets, one set being adapted for holding cone tops and the other set for holding closures which are flatter in form, such as container bottoms, and means to hold such flatter closures on the chucks by suction.

Another object of the invention is to provide in a machine of the character stated, novel means for individually feeding cone tops and affixing them removably to the chucks as they are successively presented to the cone top receiving station.

Another object of the invention is to provide a machine structure of the character stated embodying novel means for stripping the coated cone tops or other closure members from the chucks and presenting them to the coated element discharging means.

Another object of the invention is to provide in a machine structure of the character stated, novel cone top feeding means including downwardly and laterally yieldable feeder fingers which are normally disposed to engage behind and feed the cone tops step-by-step, and which are readily deflected downwardly and laterally while being retracted so that they can pass the cone tops without danger of scraping over the external surfaces thereof in a manner likely to mar the same.

Another object of the invention is to provide in a machine structure of the character stated, novel means for preventing actuation of the sprays when no elements to be sprayed are present.

With the above and other objects in view which will more fully appear, the nature of the invention will be more clearly understood by following the description, the appended claims, and the several views illustrated in the accompanying drawings.

In the drawings:

Figure 3 is a rear elevation of the machine.

Figure 4 is a horizontal section taken on the line 4—4 on Figure 2.

Figure 5 is a fragmentary horizontal sectional view of the slidable clutch-equipped shaft illustrated in Figure 4.

Figure 6 is a vertical cross sectional view taken on the line 6—6 on Figure 1.

Figure 7 is an enlarged fragmentary sectional view illustrating the means for lifting the chucks at the cone top receiving station.

Figure 8 is a vertical cross sectional view taken on the line 8—8 on Figure 1.

Figure 9 is an enlarged fragmentary sectional view illustrating the mounting of the turret on the indexing shaft.

Figures 10 and 11 are detail horizontal sectional views taken respectively on the lines 10—10 and 11—11 on Figure 9.

Figure 12 is a detail sectional view illustrating one of the alternative forms of chuck adaptable for holding relatively flat bottom closures.

Figure 2:
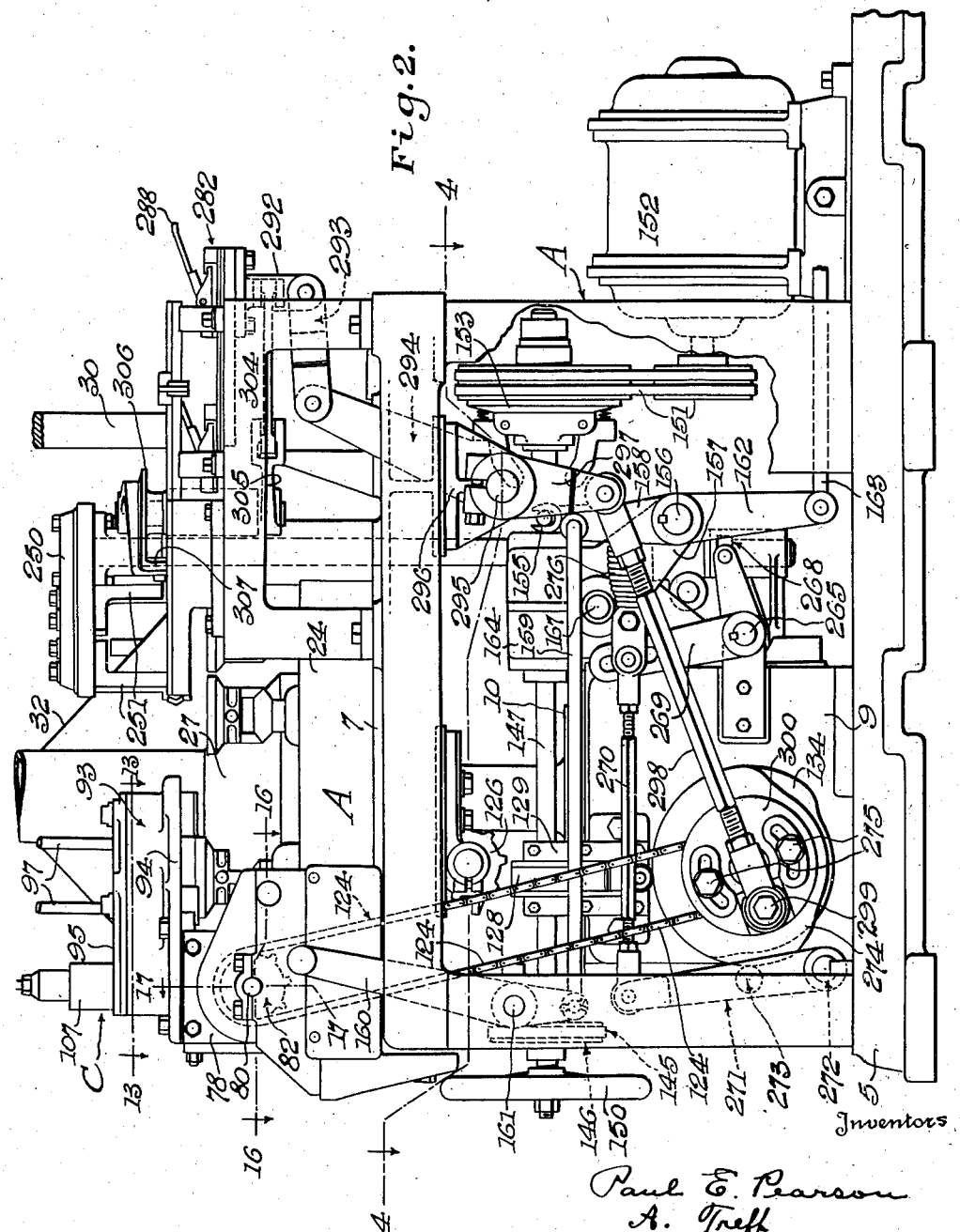
Figure 2 is a front elevation of the machine.

Figure 13 is an enlarged fragmentary horizontal section taken on the line 13—13 on Figure 2.

Figure 14 is a fragmentary vertical cross sectional view taken on the line 14—14 on Figure 13, the cone top feeding unit being shown as swung upwardly about its pivotal mounting in dotted lines.

Figure 15 is a fragmentary horizontal section taken on the line 15—15 on Figure 14.

Figure 16 is a fragmentary horizontal sectional view taken on the line 16—16 on Figure 2.

Figure 17 is a fragmentary vertical cross sectional view taken on the line 17—17 on Figure 2.

Figure 18 is a fragmentary vertical cross sectional view taken on the line 18—18 on Figure 14.

Figure 19 is a fragmentary sectional view showing one of the chucks presented for receiving a cone top from the feeding mechanism, a cone top being illustrated as having been just applied to the chuck by the feeding screws.

Figure 20 is a detail horizontal section taken on the line 20—20 on Figure 19.

Figure 21 is an inverted plan view of one of the chuck spindles and the driving head carried thereon.

Figure 22 is a plan view of one of the cone top separating plates removed from its associated feed screw.

Figure 23 is a plan view of one of the cone top feeding screws with the separating plate removed therefrom.

Figures 24 and 25 are detail plan views of one of the cone top feed screws and separator plate assemblies and respectively illustrate commencement of the act of separating a cone top from the superposed stack and the starting point of the actual down feeding engagement of the screw with the cone top.

Figure 26 is a diagrammatic development of the effective surface of one of the cone top feeding screws.

Figure 27 is a detail vertical cross section taken on the line 27—27 on Figure 19.

Figure 28 is a fragmentary horizontal sectional view taken on the line 28—28 on Figure 6.

Figure 29 is a fragmentary vertical cross section taken on the line 29—29 on Figure 28.

Figure 30 is a diagrammatic view illustrating a development of the effective surface of the indexing cam and its association with the indexing rollers.

Figure 31 is a fragmentary horizontal section taken on the line 31—31 on Figure 8.

Figure 32 is a fragmentary vertical cross section taken on the line 32—32 on Figure 31.

Figure 33 is a somewhat diagrammatic face view and part vertical section illustrating the cooperative relation of a chuck spindle, the chuck spindle lifting and lowering means, and the spray at the first spraying station.

Figure 34 is a somewhat diagrammatic face view and part vertical section illustrating the cooperative relation of a chuck spindle, the chuck spindle lifting and lowering means, and the spray at the second spraying station.

Figure 35 is a diagrammatic view illustrating a cone top and progressive spray positions attained in each of the first and second spraying operations.

Figures 36 and 37 are fragmentary sectional views illustrating the first operation spray control valve and the actuating cam, the non-spraying position of the parts being illustrated in Figure 36 and the valve open or effective spraying position being illustrated in Figure 37.

Figure 38 is a face view of the parts illustrated in Figures 36 and 37, the valve actuator being shown locked in ineffective position as when no cone top is present to be sprayed.

Figure 39 is an enlarged sectional view taken through the spray controlling valve of Figures 36 to 38, all valve elements being illustrated in the closed position.

Figure 40 is a detail face view of the sprayed cone top extractor, one of the extractor arms being shown in section.

Figure 41 is a detail horizontal sectional view taken on the line 41—41 on Figure 40.

Figure 42 is an enlarged fragmentary cross sectional view taken on the line 42—42 on Figure 41.

Figure 43 is an enlarged fragmentary plan view illustrating the cooperative relation of the sprayed cone top extractor and the discharging means, the extractor being shown in horizontal section.

Figure 1:
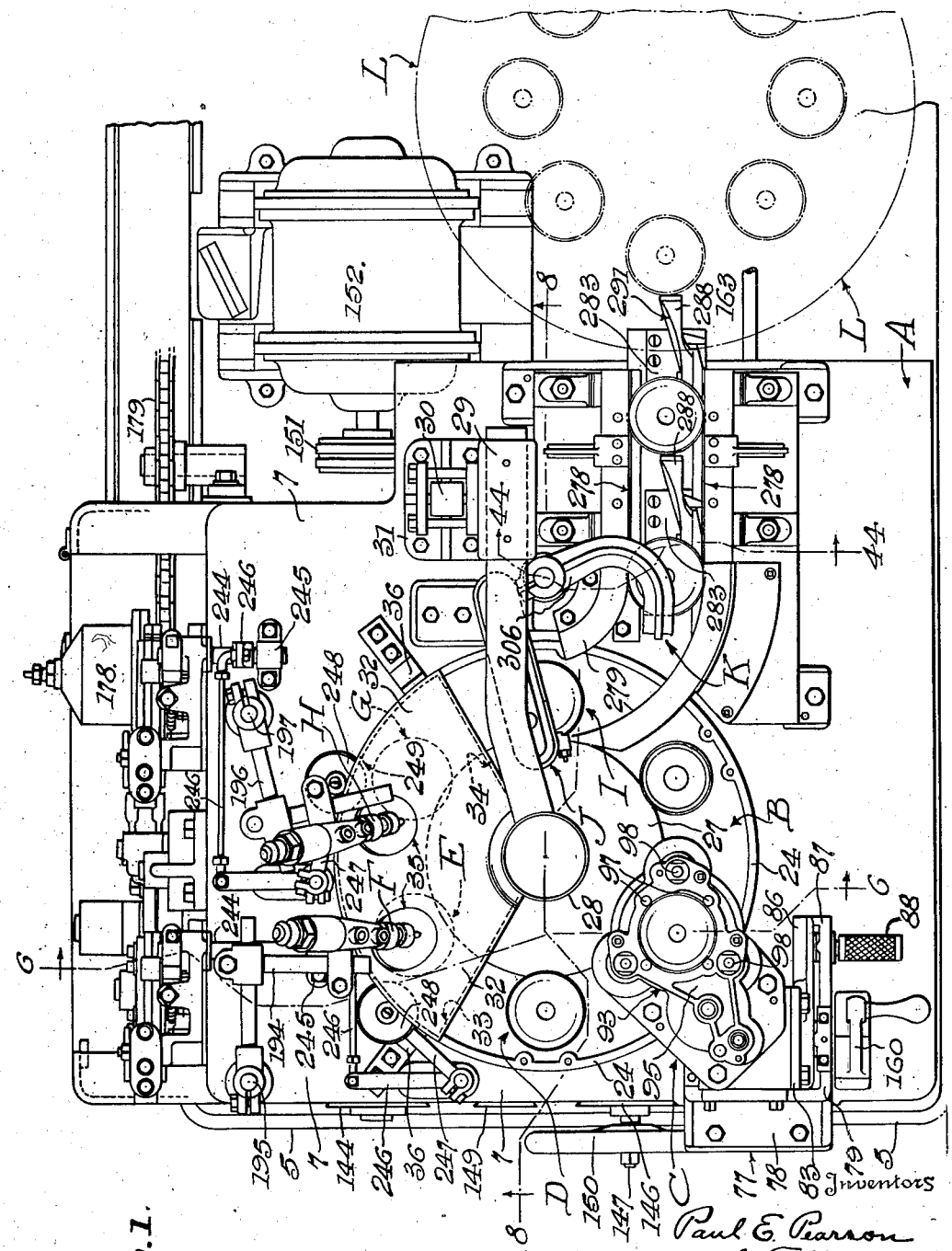
Figure 1 is a plan view illustrating a machine embodying the invention.

Figure 44 is an enlarged fragmentary cross section taken on the line 44—44 on Figure 1.

Figure 45 is a detail sectional view similar to Figure 37 and illustrating the spray controlling position of the second operation spray control valve.

Figure 46 is a fragmentary vertical cross sectional view taken on the line 46—46 on Figure 3.

Figure 47 is a diagrammatic view illustrating the associated relation of the two spray heads, the control valves therefor, the spraying fluid supply and the air supply.

In the machine herein illustrated as an example of embodiment of the invention, there is included a supporting framing generally designated A wherein is mounted a turret structure generally designated B which is adapted to be indexed step-by-step or station-to-station about a vertical axis and which is equipped with a plurality of equidistantly spaced, vertically disposed cone top holding chucks one of which is presented at each of the stations by each step movement of the turret structure.

In the particular disclosure herein made, six cone top holding chuck units are mounted on the turret structure and the machine may therefore be termed a six station machine. See Figure 1. At the first of the stations, the cone top receiving station, there is provided a cone top feeding equipment generally designated C and through the medium of which cone tops are individually applied to the chucks as they are successively presented at this station. The next of the six stations is an idle station generally designated D, and this idle station is followed by the first operation spraying station generally designated E and whereat is mounted the first operation spraying equipment generally designated F. After the chucks leave the first operation spraying station E they are presented at the second operation spraying station generally designated G whereat the second spraying unit generally designated H is mounted, and from thence the chucks are moved to the discharging station. The discharging station is generally designated I and at this station the sprayed cone tops are removed from the holding chucks by an extractor generally designated J and are discharged from the turret structure by discharge feeder means generally designated K and are delivered to a suitable drier structure, the intended position of which is indicated by dot and dash lines at L. The drier mechanism may be of any suitable structure and forms no part of the present invention.

The framing structure includes a base 5 from which rises body framing 6 whereon is supported a table portion 7 having a turret well or opening 8. See Figures 1, 2, 3, 6 and 8.

Within the body framing and on the base 5 is mounted a frame housing 9 having a removable top portion 10 which is equipped with a vertical bearing 11 for rotatably receiving the turret shaft 12. It will be observed by reference to Figure 8 of the drawings that the shaft projects above and has an indexing disk 13 secured to its lower end. The disk is equipped with six depending indexing rollers 14, one for each of the turret stations or chuck equipments, and these rollers are engageable in the indexing groove formed in the indexing cam 15 which is longitudinally adjustably secured, as at 16, on the main cam shaft 17. It will be observed by reference to Figures 6 and 8 of the drawings that the shaft 17 is horizontally disposed and is rotatable in bearings 18 provided therefor in the frame housing 9 and in a supplementary end bearing 19 which is secured, as at 20, to the base 5. The shaft 17 also carries other cams and actuator devices but these, and also the means for driving the shaft, will be described later.

A driving head 21 is secured to the upper end of the shaft 12 and this head preferably is formed of steel and is secured, as at 22, to the turret body or rotor 23 which preferably is formed of aluminum. The turret body is equipped with a peripheral flange and skirt equipment 24 encompassing the well 8, and this body also includes a small diameter upstanding flange 25 whereon is mounted a wall flange structure 26. It will be observed by reference to Figure 8 of the drawings that the flange structure 26 is surrounded by an annularly spaced cone top 27 which opens into a take-off duct 28 which is supported, as at 29, on a frame standard 30 secured, as at 31, on the table 7. A spray collecting hood 32 is attached to the cone top and duct structure 27, 28 and it will be observed by reference to Figures 1, 6 and 8 of the drawings that this hood is mounted over the spraying stations E and G. The hood 32 has an entrance opening 33 and an exit opening 34 for permitting free movement through the hood structure of the cone top holding chuck equipments later to be described. This hood structure also includes openings 35 for accommodating the positioning of the spraying equipments generally designated F and H. The hood structure 32 also is rigidly secured to the table 7 through the medium of mounting brackets 36. See Figure 1.

The turret body 23 is provided with six vertically disposed and equidistantly spaced chuck spindle bearings 37 for rotatably and vertically-reciprocably mounting the chuck spindles 38. See Figures 8, 19 and 27. Each spindle 38 is equipped at its lower end with a toothed driver head 39 and a holddown collar 40 which are clamped against the spindle shoulder 41 at the lower end of the spindle by a securing nut 42, the collar 40 being mounted on anti-friction bearings 43. Each collar 40 includes side extensions 44 from which socket sleeves 45 project vertically in parallel spaced relation to the respective spindle 38. These sleeves telescope in sockets 46 depending from the turret body 23, and compression springs 47 are mounted in the sleeves and sockets and constantly urge the spindles downwardly.

At its upper end each spindle 38 is equipped with an abutment head 48 and an underlying shock absorbing washer 49 of fiber or similar material. Each abutment head and its washer equipment 49 is engageable with the upper extremity of the respective bearing 37 so as to limit downward movement of the spindle under the urge of the spring equipments 47. Each spindle 38 is equipped at its upper end with a reduced and externally threaded extension 50, and a shedding skirt 51 which rests upon each abutment head 48 in the manner best illustrated in Figure 19 of the drawings.

A suction duct 52 is provided in the upper portion of each spindle 38 and opens endwise through the reduced upper end 50 and laterally between the vertically spaced bearing portions 37 in the manner clearly indicated in Figure 19. Each of these ducts 52 communicates with the individual duct 53 formed in the turret body 23 and which opens through the bottom face of the hard metal valve ring 54 which is secured, as at 55, to the bottom of the turret body center. The ducts 53 individually communicate with the arcuate groove 56 formed in the upper face of a valve ring 57 disposed beneath and in surface contact with the valve ring 54 and surrounding the shaft 12 and the antifriction bearing 58 which supports the weight of the shaft and the turret structure. See Figures 8 and 9. It will be observed by reference to Figures 10 and 11 of the drawings that the valve ring groove 56 extends almost three quarters of the distance about the ring or far enough to take in the cone top receiving station, the cone top discharging station and stations intervening in the direction of travel of the turret. The valve ring 57 is adapted to be connected, as at 59, with the suitable suction source (not shown) and is yieldably pressed against the cooperating valve ring 54 through the medium of a plurality of compression spring equipments 60 which are interposed between the under surface of the ring 57 and the upper surface of the turret bearing 11. The ring 57 is also secured against rotation by a pin equipment 61. The contacting faces of the valve rings 54 and 57 may be lubricated through duct equipments 62. The purpose of providing the suction duct equipments 52, 53, 56 and 59 will become apparent as the description progresses. These equipments are unnecessary when the machine is being used to spray cone tops but are desirable when flatter elements such as container bottoms are being sprayed.

A chuck unit is removably mounted at the upper end of each spindle 38, each said unit including a mounting head 63 having a threaded bore for receiving the externally threaded spindle extremity 50, and an upstanding shank 64 surmounted by a chuck cup 65 having a generally coniform recess therein for receiving the cone top bodies 66 and a center opening 67 for receiving the downwardly projecting pouring spout portion 68 of the cone tops in the manner clearly indicated in Figure 19 of the drawings. In this particular illustration the cone top spout portions 68 are shown equipped with a thread for receiving a threadably mounted closure cap, but it is to be understood that these cone top pouring spouts may be of the simple bead type adapted to receive crown caps as closure elements. When applied to the holding chucks 65 the cone tops 66 are removably held therein by frictional engagement of the spring pressed balls or detents 69 with the external surfaces of the spout portions 68 in the manner clearly indicated in Figure 19, said balls or detents being equidistantly spaced about the chuck openings 67 in the manner clearly illustrated in Figure 20.

Each cone top includes an extended flange portion 70 through the medium of which it is to be attached to a container body, and these flanges are so formed on the cone tops as to provide a heel portion 71 which is sprayed by the second operation spraying equipment H, the main interior surface portion of the cone top being sprayed by the first operation spraying equipment F.

In Figure 12 of the drawings, there is illustrated an alternative form of chuck unit which is adapted for holding flatter forms of container end closures, such as bottoms. This form of unit includes a mounting head 72 threadably mounted on the threaded extremities 50 of the spindles 38, an upstanding shank portion 73 and a relatively flat top 74. It will be observed also that a suction duct 75 extends through the shank 73 so that the suction or air evacuation effected through the valve equipments illustrated in Figures 9, 10 and 11 of the drawings will be effective to hold the relatively flat end closure elements 76 on the chucks in the manner illustrated in Figure 12 from the time at which they are applied to the chucks at station C until they are extracted or removed from the chucks at station J. See Figure 1.

The means for individually feeding and applying cone tops to the chucks at station C will now be described. A bracket 77 is secured to the table framing in the position illustrated in Figures 1 and 2 of the drawings, and a mounting head 78 is secured upon this bracket. See Figures 1, 2 and 13 through 18. The mounting head 78 includes a pair of side arm portions 79 in which a shaft 80 is secured. A bevel gear 81 is rotatably mounted on the shaft and has a driving sprocket 82 affixed thereto. See Figures 16 and 17. A housing member 83 is rockably mounted, as at 84, on the shaft 80 and about an anti-friction bearing 85 surrounding the gear 81. An arm 86 is affixed to the housing member in the position clearly illustrated in Figures 13 and 17 of the drawings. This arm also forms a part of the rockable mounting of the housing member and is extended to overlie the extension 87 from the mounting head 78 so as to form a stop limiting rocking movement of the housing member 83. A spring pressed detent 88 carried by the extension 87 is engageable in a recess 89 formed in the arm 86 and serves to secure the housing member 83 in the normal position illustrated in Figures 2 and 14 of the drawings. See also Figure 16. It is to be understood that by withdrawing the detent 88 from the receiving recess 89 the housing member 83 can be swung from its normal position illustrated in Figures 2 and 14 to an out of the way position in the manner indicated by dotted lines on Figure 14.

A vertical bearing 90 is provided in the housing member 83 and serves to rotatably support a shaft member 91 which has a bevel gear 92 affixed thereto within the housing 83 and extends vertically from said housing into the feeder casing 93 which is secured, as at 94, on the top of the housing. See Figures 2, 13, 14 and 15 of the drawings.

The feeder casing 93 forms a part of a feeder structure which is removable as a unit from the housing member 83. This unit includes a removable cover 95 and a feeder well or opening 96 through which the cone tops are fed and about which rise a plurality of cone top stacking rods or standards 97. A plurality of feeder shafts 98, three being employed in this particular disclosure, are arranged vertically and in equidistantly spaced relation about the well in the manner clearly illustrated in Figures 13 and 15. Each shaft 98 is rotatable in bearings 99 and is equipped with a spur gear 100. The spur gears 100 all mesh with a ring gear 101 which is rotatable in and partly defines the well 96. Rotation is imparted to the ring gear 101 through an idler gear 102 which is mounted on a shaft 103 rotatable in bearings 104 in the manner clearly illustrated in Figure 14, said idler gear being in turn driven by a spur gear 105. See also Figures 13 and 15.

The spur gear 105 is secured to a sleeve which is freely rotatable about the shaft 91 and is keyed to an overload release housing 107 in the manner clearly illustrated in Figure 18 of the drawings. The upper end of the shaft 91 extends into the housing 107 and has keyed thereon a disk 108 which is opposed by a spring-pressed disk 109 connected to rotate with the housing 107 but being free to move longitudinally therein. The yieldably opposed disks 108 and 109 are recessed to provide seats in which to receive driver balls 110, and it will be apparent by reference to Figure 18 that under normal conditions, rotation imparted to the shaft 91 will be transmitted through the disks 108, 109 and the housing 107 to the driver spur gear 105. Should any objectionable overload be imposed upon the feeder devices, however, the disk 109 would move longitudinally and free the balls 110 thereby to permit rotation of the shaft 91 without imparting that rotation to the driver gear 105.

A feeder screw assembly generally designated 111 is mounted at the lower end of each of the feeder shafts 98. See Figures 14, 15, 19, and 22 to 26. Each assembly 111 includes a thin separator plate 112 secured, as at 113, on top of the feed screw proper 114 which is secured at the lower end of the respective feeder shaft 98. Each separator plate 112 is shaped to provide a gradual lowering ledge 115, an under surface clearance 116, and an edge recess 117 providing a stripper or separator edge 118. See Figures 19 and 22. Each feed screw 114 has an edge clearance which extends downwardly very gradually, as at 119, to merge with a dwell shelf 120 which extends under and beyond the separator edge portion 118 of the respective plate 112 in the manner clearly illustrated in Figures 23 through 26, said shelf in turn leading to or merging with a higher pitch lowering shelf portion 121 which merges into a still higher pitch feeder groove 122 defined in part by the starting point 123.

It will be observed by reference to Figures 19, 24 and 25 of the drawings that the feeder screw assemblies rotate in counter-clockwise direction, and as these assemblies rotate, the flange extension 70 on the lowermost cone top 66 will fall through the edge recesses 117 in the separator plates 112 and onto the upper surfaces of the screws 114. The advancing separator edges 118 of the asemblies will engage over the cone top flanges in the manner clearly illustrated in Figure 19 and cause said flanges to first idle on the dwell shelf portions 120 of the screws and then progressively pass down over the lowering portions 121 and through the feeder screw portions 122, being forcibly applied to the chuck cups 65 by these portions in the manner clearly illustrated in Figure 19 so that they will be firmly held in the cups by the spring detents 69.

The driver bevel gear 81 associated with the cone top feeding mechanism is driven through the medium of a chain 124 which passes over the sprocket 82 affixed to said gear and over the sprocket 125 which is secured to the main cam shaft 17 hereinbefore referred to, a suitable adjustably mounted tightener sprocket 126 being engaged with said chain.

The means for lifting and lowering the chuck spindle at the cone top receiving station will now be described, attention being directed to Figures 2, 6 and 7 of the drawings.

A spindle lifter head 127 is supported at the upper end of a slide 128 which is vertically slidable in a guide member 129 secured to the frame housing 9 and equipped at its lower extremity with a cam engaging roller 130. The slide 128 is urged downwardly by a compression spring 131 which is interposed between a pin 132 carried by the guide member 129 and a pin 133 projecting from the slide member 128. The spring 131 serves to yieldably hold the slide against the rotary actuator cam 134 which is secured upon and rotates with the main cam shaft 17.

The operation of the cam is so timed that it will lift the slide 128 each time one of the turret spindles is presented at the cone top receiving station so as to cause the lifter head 127 to engage the respective spindle driver head 39 and lift the spindle into the cone top receiving position clearly ilustrated in Figure 19 of the drawings.

At the first and second operation spraying stations the chuck spindles must be lifted and also rotated during the spraying operations, the spindle being lifted a considerable distance and at a gradually accelerated speed at the first operation spraying station, and being lifted only a short distance at the second operation spraying station. See Figures 4, 28 and 29 of the drawings.

The frame housing 9 includes a supplementary housing portion 135 in which two identical spindle driving units are mounted, one thereof being aligned at each of the first and second operation spraying stations. Each unit includes a driver sleeve 136 which is rotatable in anti-friction bearings 137, and each sleeve has mounted therein a vertically reciprocable lifting and lowering spindle 138 which is spline-connected to the respective sleeve, as at 139, at its lower end. Each sleeve carries a worm wheel portion 140 which is engaged with a worm gear 141 mounted on a driver shaft 142, said shaft being horizontally rotatable in bearings 143 in the supplementary housing and equipped with a pulley 144 without said housing. Rotation is imparted to the shaft 142 by a belt 145 which passes over a driver pulley 146 mounted on a driver shaft 147 which is rotatable in bearings 148, and over an adjustably mounted tightener pulley 149. The shaft 147 preferably is equipped with a hand wheel 150 through the medium of which machine parts may be turned over by hand.

The shaft 147 is driven by pulley and belt power transmitting connections 151 from a motor 152 mounted on the machine base, any suitable shiftable clutch equipment 153 being included so that the driving connection between the motor and the shaft 147 can be made or broken at will.

A clutch shifter 154 is provided and is operable by a yoke 155 which is secured upon a rock shaft 156 mounted in bearings 157. A crank arm 158 is secured upon the shaft 156 and is connected by a thrust link 159 with an actuator lever 160 which is pivoted, as at 161, on the machine framing. Another crank 162 is secured to the shaft 156 and has connected thereto an actuator 163 which may be extended to the other side of the machine or to a point remote from the actuator lever 160 so as to enable engagement and disengagement of the clutch 153 from said remote point.

The shaft 147 extends through a housing 164 and is equipped within the housing with a driver worm gear 165 which meshes with and imparts rotation to a worm wheel 166 secured on a shaft 167 which is horizontally rotatable in supporting bearings 168. See Figures 4 and 5. A clutch head 169 is loosely mounted on the shaft 167 and is adapted to drive the driver spur gear 170 through an overload release connection generally designated 171 whenever the driver clutch head 172 which is splined on the shaft 167 is moved into driving contact with the clutch head 169.

A clutch head shifter yoke 173 engages the driver clutch head 172 in the manner clearly illustrated in Figures 4 and 8 of the drawings, and this yoke is mounted on a push pull actuator 174 through the medium of which proper shifting of the driver clutch head 172 can be effected. See Figure 28.

The driver spur gear 170 meshes with and drives an idler gear 175 which in turn meshes with and drives the gear 176 secured upon the main cam shaft 17, thereby to impart rotation to said main cam shaft.

A driver sprocket 177 is mounted on a sleeve which is freely rotatable about the shaft 167 and which is normally intended to be driven with the shaft through the medium of the overload release connection generally designated 178 and which is secured upon the end of the shaft 167 in the manner clearly illustrated in Figure 5 of the drawings. The sprocket 177 normally serves to drive the cone top drier diagrammatically indicated at L in Figure 1 through the medium of the driver chain 179. This drying mechanism forms no part of the present invention and it is to be understood that any approved form of drier can be associated with the novel coating machine herein disclosed. An example of an acceptable form of drier is to be found in the U. S. Letters Patent 1,570,122, issued to Bisset on January 19, 1926.

Each of the spindles 138 has a toothed driving head 180 removably affixed at its upper end, as at 181, and also carries a lifter head 182 which is movable vertically with the spindle but has anti-friction bearing thereon, as at 183, so that it can be held motionless while the spindle rotates therein. Each lifter head 182 has trunnion connection with an actuator crank 184 secured to a rock shaft 185 which is rockably mounted in bearings 186. See Figures 4, 6, 28 and 29.

The shafts 185 also have actuator cranks 187 affixed to the ends thereof remote from the cranks 184 and which are individually connected to thrust links 188 which have forked ends 189 each disposed to straddle a block 190 on the main cam shaft 17 in the manner clearly illustrated in Figures 6, 33 and 34 of the drawings. Each fork is equipped with a roller 191, one said roller being engaged in the actuator groove in a control cam 192 and the other in the actuator groove in the control cam 193, both said cams being affixed to the main cam shaft 17.

It will be readily understood by reference to Figure 33 of the drawings that the cam associated with the first operation spraying station will serve to lift the spindle 138 and the overlying chuck spindle 38 a considerable distance and at a gradually accelerated rate, whereas the cam 193 associated with the second operation spraying station will lift the connected spindle 138 and the overlying chuck spindle 38 only a short distance. See Figure 34. It will be obvious also that during the whole time the driving head 180 of the spindle 138 is in contact with the driver head 39 on the respective spindle 38, the rotation of the spindle 138 will be imparted to the respective chuck cup 65 and the cone top yieldably affixed thereto.

The spray head F disposed at the first operation spraying station is adjustably supported, as at 194, on a standard 195 arising from the table 5, and the spray H is similarly adjustably supported, as at 196, on the standard 197 arising from said table. See Figures 1 and 3 of the drawings.

The spray controlling valve equipments hereinbefore referred to and generally designated FV and HV will now be described in detail together with the association thereof in the spraying system.

The spraying system includes a spray fluid reservoir 198 into which air is directed through a regulator 199 and a line or duct 200 from the main air supply line 201. Air is also directed at controlled pressure to the valve FV from the main supply by a line 202, and to the valve HV by a line 203. Air is also directed at main line pressure through a solenoid valve 204 and through ducts or lines 205 and 206 respectively to the valves FV and HV in the manner clearly indicated in Figure 47. The valve structures and the actuating devices therefor are best illustrated in Figures 36 and 39 and in Figures 45 and 46. It is to be understood that the solenoid valve 204 is so connected in the system that it will be closed each time the clutch equipment 153 is released, thereby to cut off the main line pressure supply whenever the clutch equipment is disconnected.

The valve FV is connected through a controlled pressure line 207 with the spray head F and also has a main line pressure connection with the spray head F through the line or duct 208. The valve HV similarly has a controlled pressure line connection 209 with the spray head H and also has a main line pressure connection with the spray head H through the line or duct 210, said line also being adapted to communicate with the atmosphere for exhausting purposes in a manner later to be described.

A spray fluid line 211 connects between the reservoir 198 and the spray head F, and a similar spray fluid line 212 connects between said reservoir and the spray head H, each said line having a fluid regulator 213 connected therein as illustrated in Figure 47.

It will be observed by reference to Figure 39 of the drawings that each of the valves FV and HV has a chamber 214 through which communication can be had through a spring seated and cam unseated tappet valve 215 between the lines 202 and 207 or the lines 203 and 209. Each valve also includes a chamber 216 and a cross duct 217 through which communication can be had through a similar valve 218 between the lines 205 and 208 or 206 and 210. A chamber 219 also is provided in each valve, and associated therewith is an exhaust duct 220 which communicates with atmosphere through a seat controlled by a tappet valve 221. It will be apparent that when the valve 221 is unseated, the chamber 219 and the connected line or duct 208 or 210 will be exhausted to atmosphere.

It will be observed by reference to Figures 36 to 39 and 45 that the valves are spring seated and that the tappets thereof extend outside the valve casing. A rockable actuator 222 is pivotally supported, as at 223, on each of the valves FV and HV, the pivotal mounting being disposed between the valves 218 and 221. Each actuator is equipped with an adjustable tappet 224 disposed for engaging and unseating the valves 221 whenever the actuator is in its elevated position, as shown in Figures 36 and 38, and for unseating the valves 215 and 218 and permitting said valve 221 to seat whenever the actuator is in its lowered position as illustrated in Figure 37.

An anchored spring 225 holds the actuator 222 associated with the valve FV against an actuator cam 226. It will be apparent by reference to Figures 36 and 37 that the cam is provided with a peripheral clearance dwell portion 227 extending almost 300° of the circumference of the cam, and an adjustable crest dwell portion 228. When the clearance dwell portion 227 of the cam is engaged by the actuator 222, the actuator will be positioned as illustrated in Figure 37 to seat the valve 221 and open both valves 215 and 218 thereby to supply needle valve opening air, atomizing air, and spraying fluid to the spray head F and bring about a spraying of the positioned cone top. It will also be apparent that when the crest dwell portion 228 of the cam is being engaged by the actuator, the valves 215 and 218 will be seated to cut off air and fluid from the spray head and the valve 221 will be opened to exhaust pressure from the spray head through the line 208.

The actuator 222 associated with the valve HV is yieldably held by an anchored spring 229 against the periphery of an associated control cam 230, and like the previously described control cam 226, this cam includes a clearance dwell portion 231 and a crest dwell portion 232 which function like the clearance and crest dwell portions previously described except for the fact that the clearance portion extends over slightly less than 60° of the circumference of the cam and therefore provides for only a short spray interval. It will be apparent by reference to Figures 3 and 4 of the drawings that the crest and dwell portions of both of the cams 226 and 230 can be adjusted to vary the spray intervals.

Each of the cams 226 and 230 is mounted on a shaft 233 which is rotatable in a frame bearing 234 and has a driving sprocket 235 affixed thereon. The shafts 233 are driven by a single chain 236 which passes over both sprockets 235, over an adjustable idler sprocket 237 and over a driver sprocket 238 secured upon the main cam shaft 17.

Each actuator 222 is equipped at its free end with a latch head 239, said latch head being disposed for engagement with a latch 240 carried by a rocker member 241. Each rocker member is urged by an anchored spring 242 against an adjustable stop 243, and when disposed against said stop is positioned to cause the latch member carried thereby to engage under the associated latch head 239 in the manner illustrated in Figure 38 for holding the respective actuator out of effective engagement with the respective cam 226 or 230. It will be obvious that when an actuator 222 is latched in the position illustrated in Figure 38 no spraying function can be performed.

Each rocker member 241 is secured on a shaft 244 which is rockable in suitable bearing equipment 245, and each shaft is connected by crank and link connections 246 with a swingably mounted arm 247 whereon is mounted a roller 248. It will be observed by reference to Figures 1 and 3 of the drawings that the rollers 248 are so positioned that they will permit free passage of the chuck cups 65 but will be engaged and displaced by engagement with edge portions of cone tops 66 mounted in said cups in the manner illustrated in Figure 19 of the drawings. This engagement with the chuck cup borne cone tops is effected through suitable openings 249 formed in the hood 32. See Figure 3.

It will be obvious that as each chuck and the cone top to be sprayed thereon which has been applied to the chuck cup at the receiving station C approaches a spraying station, the extended flange portion of the cone top will engage and displace the respective roller 248 and move the rocker member 241 from the normal position illustrated in Figure 38 to the out of the way position illustrated in Figures 36 and 37, thus freeing the respective actuator 222 for effective engagement with the peripheral surface of the respective control cam 226. Whenever a chuck cup is indexed about without a cone top applied thereto, it will pass the rollers 248 without contacting them, and consequently the rocker member 241 will be left in the normal position illustrated in Figure 38, in which position the actuator latch head 239 will engage under the latch 240 and secure the actuator 222 in the ineffective position illustrated in Figure 38, thus preventing effective operation of the spray head.

After the sprayed cone tops pass the second operation spraying station they come to rest at the extractor station J. See Figures 1, 2, 3, 8, 31, 32, and 40 to 42.

At the extractor station there is mounted an extractor head 250 to which a pair of extractor arms 251 are adjustably secured, as at 252, to depend in spaced relation, one at each side of the path of travel of the sprayed, chuck carried cone tops. See Figures 40 and 41. The arms 251 are equipped with aligned grooves 253 for receiving the flange portions of the cone tops, and these flange portions move into the grooves as the respective sprayed cone top is moved into the extractor station by the respective chuck cup 65. One of the arms 251 is equipped with two spring-pressed detents 254 which engage the flange portion of a cone top when positioned in the arm grooves so as to yieldably grip the cone top. See Figures 41 and 42.

The extractor head 250 is secured, as at 255, to the upper end of a vertically reciprocable rod 256. The rod is vertically movable in bearings 257 and is equipped with an abutment collar 258, a compression spring 259 being interposed between the collar and the overlying frame portion and serving to yieldably hold the rod in its normal, lowered position, namely, the position in which the arm grooves 253 are disposed to receive the flange portions of cone tops as they are indexed to the extractor station.

A sleeve 260 is secured by a cross pin 261 to the lower end of the rod 256, and this sleeve includes an arm extension 262 which is vertically slidable in a guide 263 secured to the frame housing 9 and which is effective to prevent turning of the rod 256 about its axis. See Figures 8, 31 and 32. A bifurcated crank arm 264 is secured to a rock shaft 265 which is rockable in suitable bearings 266. The arms of the crank member 264 straddle the rod 256 and are equipped with rollers 267 which engage in recesses 268 in the sides of the sleeve 260 so that up and down swinging movement of the crank member 264 will impart vertical reciprocation to the rod 256 and the extractor head carried at the upper end thereof.

A crank arm 269 is secured to the rock shaft 265 and is connected by an adjustable link 270 with an actuator arm 271 which is pivoted, as at 272, on the framing and is equipped with a roller 273 engaged by a rotary cam 274 which is adjustably secured, as at 275, on the rotary cam 134 hereinbefore referred to. A retractile spring equipment 276 serves to hold the actuator arm roller 273 against the cam 274. See Figures 2 and 6.

The cam 274 is so timed that each time a cone top is indexed to the extractor station and received in the extractor arm grooves 253 in the manner illustrated in Figures 40 and 41, the rod 256 will be lifted and the arms 251 will extract the cone top from the chuck cup 65 in which it was sprayed and elevate the same so that the pouring spout portion 68 thereof will be clear of the upper extremity of said cup.

The sprayed cone top discharging means hereinbefore referred to and generally designated K will now be described. Upon a superstructure framing 277 mounted on the table 7 are provided laterally spaced cone top supporting guideways 278, said guideways including curved receiving portions 279 the receiving ends of which are disposed in alignment with and close to the vertically reciprocable extractor arms 251. See Figures 1 and 43 of the drawings.

A straight line slideway 280 is provided beneath the cone top supporting guideways 278, and a feed slide 281 is reciprocable therein toward and from the drier L. Two feeder units 282 are mounted on the slide and each includes a base 283 which is removably secured to the slide, a carrier 284 pivoted, as at 285, on the base for lateral swinging movement about a vertical axis, an arm extension 286 being provided and engaged with a compression spring 287 for yieldably resisting said lateral swinging movement. A feed finger 288 is mounted on a horizontal pivot 289 on each carrier 284 and is urged by a compression spring 290 to the normal elevated position illustrated in Figures 2, 3 and 44 of the drawings. Each feeder finger 288 is equipped with a side edge clearance 291 which is engageable with the coniform portion of cone tops as the slide is being retracted after a forward feeding movement, thus enabling the feeder fingers to be deflected laterally and downwardly in a manner to clear the forwardly fed cone tops without danger of damaging surface portions thereof.

A bracket 292 depends from the slide 281 in the manner clearly illustrated in Figures 2 and 44 of the drawings and is connected by a link 293 to a crank arm 294 which is secured to a rock shaft 295 rockably mounted in a bearing 296 supported on the framing. A crank 297 is secured to the other end of the shaft 295 and is connected by an adjustable link 298 to a crank pin 299 which is adjustably secured to the crank disk 300. It will be observed by reference to Figures 2 and 6 of the drawings that the crank disk 300 is adjustably secured to a carrier disk 301 which is affixed to the end of the main cam shaft 17.

On the superstructure framing 277 is supported a vertical bearing 302 which rockably supports a feeder shaft 303. The shaft 303 is equipped with a crank 304 at its lower end which is link-connected, as at 305, to the slide 281. It will be obvious by reference to Figures 2, 43 and 44 of the drawings that as the slide is reciprocated, rocking movement will be imparted to the shaft 303. A feeder arm 306 is secured to the upper end of the shaft 303 and is curved so that it can extend through between the extractor arms 251 in the manner clearly illustrated in Figure 43. The feeder arm carries a depending feeder finger 307 at its free end.

The oscillation of the feeder arm 306 is so timed that it will be disposed in the position illustrated in Figure 43 each time the extractor arms 251 are lifted to extract a sprayed cone top from the holding chuck in the manner previously described, after which the feeder arm will swing to the position illustrated in Figure 2 and thereby move the extracted cone top onto the guideways 278 in position for being engaged and fed along step-by-step by the reciprocable feeder fingers 288.

*Operation*

After each chuck cup 65 is indexed to the receiving station it will be elevated to the cone top receiving position illustrated in Figure 19 by the elevating mechanism illustrated in detail in Figure 7. While in its elevated position the cup will have a cone top affixed thereto by the feeder screw assembly equipments illustrated in detail in Figures 19 and 22 through 26, said assemblies forming a part of the cone top feeding mechanism illustrated in detail in Figures 13 through 18.

The chuck bearing the cone top to be sprayed is next indexed to the idle station D and from thence through the hood opening 33 to the first operation spraying station E whereat is positioned the first operation spray head F. At this station the chuck will be rotated and lifted by the equipment illustrated in Figure 33 so as to present the cone top for having the interior portion thereof sprayed, the control cam 192 being effective, in the manner hereinbefore described in detail, to lift the cone top at a gradually increasing rate of lift. By thus rotating the cone top and simultaneously lifting the same at a gradually increasing rate of lift, the rate of lift will increase accordingly as the diameter of the portion being sprayed, and consequently the area being sprayed, decreases, thereby assuring the provision of a uniform coating throughout the whole of the internal area of the cone top. In other words, the lifting of the cone top is slow as the spray strikes the large diameter of the cone top and increases as the diameter decreases. This progressive rate of lift and uniform spraying is diagrammatically indicated in Figure 35 by the varied spacing of the spray lines 308. When the spraying of a cone top is completed, the chuck spindle will be lowered and the chuck will be advanced to the second operation spraying station G.

At the second operation spraying station, the partially sprayed cone top will be lifted and rotated by the mechanism illustrated in Figure 34 so as to effect the second operation spraying, namely, the spraying of the heel portion 71 of the cone top. As has been previously described, the amount of lift imparted to the cone top carrying chucks at this station is comparatively slight and since the heel is of uniform diameter, a uniform lifting of the cone tops will suffice. This second operation spraying of the cone tops is illustrated diagrammatically at 309 in Figure 35. After the second operation spraying function is completed, the cone top is lowered and indexed to the extractor station.

At the extractor station, the sprayed cone top is moved into the receiving grooves 253 in the extractor arms 251 in the manner clearly illustrated in Figures 40, 41 and 43 of the drawings. At this time the feeder arm finger 307 will be disposed at the position illustrated in Figure 43. When the sprayed cone top has come to rest at the extractor station, the extractor head 250 is lifted and the arms 251 extract the cone top from the chuck cup 65 and move it upwardly clear of the path of travel of the cup and into the path of travel of the feeder arm finger 307. It will be obvious by reference to the central portion of Figure 8 that a holder hook Z is fixedly mounted in position to overlie each head collar 40 as it is presented at the sprayed cone top extracting or stripping station, and as the extractor head 250 is lifted, said hook positively holds the collar 40 and the associated cup 65 against movement upwardly with the extractor head and the cone top engaged in the groove 253 thereof. The arm 306 swings from the position illustrated in Figure 43 to the position illustrated in Figure 1 and moves the cone top onto the guideways 278 over which they are fed by the reciprocating fingers 288 to the drying machine L or to any other take-away mechanism. Each time the feeder slide 281 is retracted after each forward feeding step, the feeder fingers 208 will be deflected laterally and downwardly in a manner for avoiding displacement or damaging of the cone tops 66.

In preparing the machine for the spraying of such ends, the cone top chucks 65 are replaced by the suction chucks shown in Figure 12. The spraying of the flat can ends is preferably performed at only the second spraying station by the spraying unit H which, of course, must be properly adjusted for providing a spray having the required radial spread.

Inasmuch as the spraying unit F at the first spraying station is not utilized in the spraying of flat ends, the arm 247 is moved for positioning the roller 248 so that it will not engage the passing can ends, and, consequently, the rock arm 222 will be continually held in its suspended position by the latch 240, as shown in Figure 38, so that the valve FV will not be actuated by the cam 226. From the above, there will, obviously, be no need for lifting the flat can ends at the first spraying station, and consequently, the thrust link 188 and forked end 189 associated with the cam 192 are detached therefrom. All of the cams and other apparatus associated with the second spraying station remain unchanged, however, as the same apparatus is empolyed for spraying both flat can ends and cone top ends at the second spraying station. It will be apparent that the spray is directed on the near sides of the flat can ends relatively to the spraying unit, and that the vertical movement of the can ends resulting from the cam 193 is very small.

It is of course to be understood that the details of structure and arrangement of parts may be variously changed and modified without departing from the spirit and scope of the invention.

We claim:

1. In a machine of the character described wherein is provided a cone top receiving station, a cone top spray coating station and a spray coated cone top discharging station, a cone top carrier, means for presenting the carrier successively at said stations, means for applying cone tops to the carrier at the receiving station, a spray means mounted at the spray coating station, means for lifting and lowering and rotating said carrier relative to said spray means, and means at the discharging station for discharging spray coated cone tops from said carrier.

2. A machine as defined in claim 1 in which are included in said lifting means devices for imparting the lifting movement at a rate which gradually changes reversely as the rate of change in diameter of the carried cone top changes, and spray control means effective to start the spray coating at a definite location on a large diameter portion of a carried cone top and stop the spray coating at a definite location on a small diameter portion of said carried cone top.

3. A machine as defined in claim 1 in which are included in said lifting means devices for imparting the lifting movement at a rate which gradually changes reversely as the rate of change in diameter of the carried cone top changes, and adjustable cam actuated spray control means effective to start the spray coating at a definite location on a large diameter portion of a carried cone top and stop the spray coating at a definite location on a small diameter portion of said carried cone top.

4. A machine as defined in claim 1 in which are included in said lifting means devices for imparting the lifting movement at a rate which gradually changes reversely as the rate of change in diameter of the carried cone top changes, spray control means effective to start the spray coating at a definite location on a large diameter portion of a carried cone top and stop the spray coating at a definite location on a small diameter portion of said carried cone top, and means for rendering said control means ineffective to provide a spraying action when the carrier is presented at the spray coating station without a cone top thereon.

5. A machine as defined in claim 1 in which the cone top carrier includes a cup in which the cone tops are received, and means for yieldably holding cone tops in place in said cup.

6. A machine as defined in claim 1 in which the cone top carrier includes a cup in which the cone tops are received, and spring detent means carried by and equidistantly spaced about the cup and engageable with cone top portions for yieldably holding cone tops in place in said cup.

7. A machine as defined in claim 1 in which the cone top carrier includes a cup in which the cone tops are received, and spring detent means carried by and equidistantly spaced about the cup and engageable with cone top portions for yieldably holding cone tops in place in said cup, and in which said cone top applying means includes rotatable screw elements effective to positively place the cone tops in position for being yieldably held by said detent means.

8. A machine as defined in claim 1 in which the cone top carrier includes a cup in which the cone tops are received, and spring detent means carried by and equidistantly spaced about the cup and engageable with cone top portions for yieldably holding cone tops in place in said cup, and in which said cone top applying means includes rotatable screw elements effective to positively place the cone tops in position for being yieldably held by said detent means, and there is included means for lifting said carrier to place the cup thereof in position to have a cone top pressed thereinto each time said carrier is presented at the receiving station.

9. A machine as defined in claim 1 in which the cone top carrier includes a cup in which the cone tops are received, and means for yieldably holding cone tops in place in said cup, and in which said discharging means includes a spray coated cone top feedway at said discharging station, stripper means for stripping spray coated cone tops from said cup, and means for moving the stripped cone tops onto said feedway.

10. A machine as defined in claim 1 in which the cone top carrier includes a cup in which the cone tops are received, and means for yieldably holding cone tops in place in said cup, and in which said discharging means includes a spray coated cone top feedway at said discharging station, stripper means for stripping spray coated cone tops from said cup and including grooved and laterally spaced arms between which the cup moves in travelling to the discharging station with edge portions of the carried cone top engaging in the arm grooves, means for lifting the arms to strip the cone top from the cup, and means for moving the stripped cone top from the arm grooves onto said feedway.

11. A machine as defined in claim 1 in which the cone top carrier includes a cup in which the cone tops are received, and means for yieldably holding cone tops in place in said cup, and in which said discharging means includes a spray coated cone top feedway at said discharging station, stripper means for stripping spray coated cone tops from said cup and including grooved and laterally spaced arms between which the cup moves in travelling to the discharging station with edge portions of the carried cone top engaging in the arm grooves, means for lifting the arms to strip the cone top from the cup, and a finger reciprocable back and forth between said arms and engageable with cone tops stripped from the cup and in said grooves for moving them onto said feedway.

12. A machine as defined in claim 1 adapted for coating cone tops, each including a coniform body merging into a downwardly turned heel and an outwardly turned flange in which the cone top carrier includes a cup in which the cone tops are received, said cup being dimensioned to fit closely within each cone top heel so as to support the respective cone top against free lateral movement in the cup.

13. A machine as defined in claim 1 adapted for coating cone tops, each including a coniform body merging into a downwardly turned heel and an outwardly turned flange in which the cone top carrier includes a cup in which the cone tops are received, said cup being dimensioned to fit closely within each cone top heel so as to support the respective cone top against free lateral movement in the cup, spray control means effective to start the spray coating at a definite location on a large diameter portion of a carried cone top and stop the spray coating at a definite location on a small diameter portion of said carried cone top, and means effective to prevent actuation of the control means for initiating a spray coating function and displaceable from its spray initiation preventing condition each time it is engaged and displaced by a cone top flange indicating the presence of a cone top in position to be spray coated, thereby to prevent initiation of a spray coating function when the cup is presented at the spray coating station without a cone top thereon to be spray coated.

14. A machine as defined in claim 1 in which the cone top carrier includes a cup in which the cone tops are received, a vertically reciprocable carrier spindle on which the cup is mounted and having a driving head at its lower end, and in which said lifting and lowering and rotating means includes a vertically reciprocable driving spindle having a driving head at its upper end engageable in driving relation with said first mentioned driving head when it is at the spray coating station, a continuously rotating sleeve in which said driving spindle is vertically slidable and spline connected, and means for lifting and lowering said driving spindle.

15. A machine as defined in claim 1 in which the cone top carrier includes a cup in which the cone tops are received, a vertically reciprocable carrier spindle on which the cup is mounted and having a driving head at its lower end, and in which said lifting and lowering and rotating means includes a vertically reciprocable driving spindle having a driving head at its upper end engageable in driving relation with said first mentioned driving head when it is at the spray coating station, a continuously rotating sleeve in which said driving spindle is vertically slidable and spline connected, and means for lifting and lowering said driving spindle and including devices for imparting the lifting movement at a rate which gradually changes reversely as the rate of change in diameter of the carried cone top changes.

16. In a machine of the character described wherein is provided a cone top receiving station, a first operation cone top spray coating station, a second operation spray coating station and a spray coated cone top discharging station, a cone top carrier, means for presenting the carrier successively at said stations, means for applying cone tops to the carrier at the receiving station, a spray means mounted at each spray coating station, each cone top including a coniform body merging into a downwardly turned heel and an outwardly turned flange, means for rotating and lifting and lowering said carrier relative to the spray means at each spray coating station for successively spray coating first a coniform body portion and then a heel portion of each presented cone top, and means at the discharging station for discharging spray coated cone tops from said carrier.

17. A machine as defined in claim 16 in which each cone top carrier includes a cup in which the cone tops are received, a vertically reciprocable carrier spindle on which the cup is mounted and having a driving head at its lower end, and in which each said lifting and lowering and rotating means includes a vertically reciprocable driving spindle having a driving head at its upper end engageable in driving relation with said first mentioned driving head when it is at the spray coating station, a continuously rotating sleeve in which each said driving spindle is vertically slidable and spline connected, a common means for driving both sleeves, and means for differentially lifting said driving spindles to effect the coniform body portion coating at the first operation station and the heel portion coating at the second operation station.

18. In a machine of the character described wherein is provided a cone top receiving station, a cone top spray coating station and a spray coated cone top discharging station, a turret having a plurality of carrier mounting bearings thereon in equidistantly spaced relation, means for indexing the turret to successively present the bearings thereon at the several stations, a cone top carrier spindle reciprocably mounted on each bearing, means for applying cone tops to the carrier spindles at the receiving station, a spray means mounted at the spray coating station, means operable at the spray coating station for moving each carrier spindle there presented toward and from the spray means for spray coating a carried cone top, and means at the discharging station for discharging spray coated cone tops from the carrier spindles.

19. A machine as defined in claim 18 in which are included in said carrier spindle moving means devices for imparting movement toward the spray means at a rate which gradually changes reversely as the rate of change in diameter of the carried cone top changes, and spray control means effective to start the spray coating at a definite location on a large diameter portion of a carried cone top and stop the spray coating at a definite location on a small diameter portion of said carried cone top.

20. A machine as defined in claim 18 in which are included in said carrier spindle moving means devices for imparting movement toward the spray means at a rate which gradually changes reversely as the rate of change in diameter of the carried cone top changes, spray control means effective to start the spray coating at a definite location on a large diameter portion of a carried cone top and stop the spray coating at a definite location on a small diameter portion of said carried cone top, and means for rendering said control means ineffective to provide a spraying operation when any carrier spindle is presented at the spray coating station without a cone top thereon.

21. A machine as defined in claim 18 in which each carrier spindle is equipped with a cup in which the cone tops are received, and in which each cup is equipped with equidistantly spaced spring detent means engageable with cone tops for yieldably holding them in place.

22. A machine as defined in claim 18 in which each carrier spindle is equipped with a cup in which the cone tops are received, each cup is equipped with equidistantly spaced spring detent means engageable with cone tops for yieldably holding them in place, said cone top applying means includes rotatable screw elements effective to positively place the cone tops in position for being yieldably held by said detent means, there is included means for moving each carrier spindle presented at the receiving station toward the screw elements into position for having a cone top pressed thereinto, and means is provided for displaceably mounting said screw elements so that they can be moved away and render accessible the turret portion and carrier spindle presented at the receiving station.

23. A machine as defined in claim 18 in which each carrier spindle is equipped with a cup in which the cone tops are received, each cup is equipped with equidistantly spaced spring detent means engageable with cone tops for yieldably holding them in place, said cone top applying means includes rotatable screw elements effective to positively place the cone tops in position for being yieldably held by said detent means, there is included means for moving each carrier spindle presented at the receiving station toward the screw elements into position for having a cone top pressed thereinto, driving means for said screw elements, and means is provided for displaceably mounting said screw elements so that they can be moved away and render accessible the turret portion and carrier spindle presented at the receiving station without disabling said screw element driving means.

24. A machine as defined in claim 18 in which each carrier spindle is equipped with a cup in which the cone tops are received, each cup is equipped with equidistantly spaced spring detent means engageable with cone tops for yieldably holding them in place, and in which said discharging means includes a spray coated cone top feedway at the discharge station, a stripper head disposed radially over the turret at the discharge station and including grooved and laterally spaced arms between which each cup moves upon presentation at said discharge station with edge portions of the carried cone top engaging in the arm grooves, means for lifting the arms to strip the cone top from the presented cup, and a finger reciprocable back and forth between the arms and engageable with cone tops stripped from presented cups and supported in the arm grooves for moving them onto said feedway.

25. A machine as defined in claim 18 in which each carrier spindle includes a cup at one end in which the cone tops are received and a driving head at its other end, and in which said carrier spindle moving means comprises an axially reciprocable driving spindle placed to axially align with each carrier spindle as it is presented at the spray coating station and having a driving head at one end for cooperating with the carrier spindle driving heads, a continuously rotated sleeve in which the driving spindle is slidable and spline connected, and means for imparting a complete reciprocation to the rotating driving spindle each time a carrier spindle comes to rest at the spray coating station.

26. A machine as defined in claim 18 in which each carrier spindle includes a cup at one end in which the cone tops are received and a driving head at its other end, and in which said carrier spindle moving means comprises an axially reciprocable driving spindle placed to axially align with each carrier spindle as it is presented at the spray coating station and having a driving head at one end for cooperating with the carrier spindle driving heads, a continuously rotated sleeve in which the driving spindle is slidable and spline connected, and means for imparting a complete reciprocation to the rotating driving spindle each time a carrier spindle comes to rest at the spray coating station and including devices for imparting the stroke movement portion effective during actual spray coating at a rate which gradually changes reversely as the rate of change in diameter of the carried cone top changes.

27. In a machine of the character described wherein is provided a cone top receiving station, a first operation cone top spray coating station, a second operation cone top spray coating station, a turret having a plurality of carrier mounting bearings thereon in equidistantly spaced relation, means for indexing the turret to successively present the bearings thereon at the several stations, a cone top carrier spindle reciprocably mounted in each bearing, means for applying cone tops to the carrier spindles at the receiving station, each cone top including a coniform body merging into a downwardly turned heel and an outwardly turned flange, a spray means mounted at each spray coating station, means operable at the first operation station for moving each carrier spindle there presented toward and from the respective spray means for spray coating a coniform body portion of a carried cone top, means operable at the second operation station for moving each carrier spindle there presented toward and from the respective spray means for spray coating a heel portion of a carried cone top, and means at the discharge station for discharging spray coated cone tops from the carrier spindles.

28. A machine as defined in claim 27 in which each carrier spindle includes a cup at one end in which the cone tops are received and a driving head at its other end, and in which said carrier spindle moving means comprises an axially reciprocable driving spindle placed at each said spray coating station to axially align with each carrier spindle as it is presented at the particular spray coating station and having a driving head at one end for cooperating with the carrier spindle driving heads, a continuously rotated sleeve for and in which each driving spindle is slidable and spline connected, and means for imparting a complete reciprocation to each rotating driving spindle each time a carrier spindle comes to rest at the respective spray coating station.

29. In a machine of the character described wherein is provided an end closure receiving station, an end closure spray coating station and a spray coated end closure discharging station, a turret having a plurality of carrier mounting bearings therein in equidstantly spaced relation, means for indexing the turret to successively present the bearings thereon at the several stations, an end closure carrier spindle reciprocably mounted in each bearing, means for applying end closures to the carrier spindles at the receiving station, a spray means mounted at the spray coating station, means operable at the spray coating station for moving each carrier spindle there presented toward and from the spray means for spray coating a carried end closure, and means at the discharging station for discharging spray coated end closures from the carrier spindles, each said carrier spindle having removably and replaceably mounted thereon an end closure carrier head selective in form in accordance with the form of the particular end closures to be spray coated.

30. A machine as defined in claim 29 in which the turret is provided with a valve ring movable therewith and an individual end closure holding suction duct extending therethrough and through the valve ring and each spindle and the carrier head mounted thereon, and in which there is included a stationary valve ring adapted to have connection with a suction source and to control evacuation of the individual ducts so as to hold end closures on the respective carrier heads by atmospheric pressure while they travel the distance intervening the receiving and discharging stations.

31. A machine as defined in claim 18 in which each carrier spindle is equipped with a cup in which the cone tops are received, each cup is equipped with equidistantly spaced spring detent means engageable with cone tops for yieldably holding them in place, and in which said discharging means includes a spray coated cone top feedway at the discharge station, a stripper head disposed radially over the turret at the discharge station and including grooved and laterally spaced arms between which each cup moves upon presentation of said discharge station with edge portions of the carried cone top engaging in the arm grooves, a vertically reciprocable rod on which said stripper head is mounted, means for lifting the rod and the head and arms thereon to strip the cone top from the presented cup, means for holding the rod against movement about its axis as it is being lifted or lowered, and a finger reciprocable back and forth between said arms and engageable with cone tops stripped from presented cups and supported in the arm grooves for moving them onto said feedway.

32. A machine as defined in claim 1 in which the cone top carrier includes a cup in which the cone tops are received, and means for yieldably holding cone tops in place in said cup, and in which said discharging means includes a spray coated cone top feedway at said discharging station, stripper means for stripping spray coated cone tops from said cup, means for positively holding the cup against movement with the stripper means while the cone top is being stripped therefrom, and means for moving the stripped cone tops onto said feedway.

33. A machine as defined in claim 18 in which each carrier spindle is equipped with a cup in which the cone tops are received, each cup is equipped with equidistantly spaced spring detent means engageable with cone tops for yieldably holding them in place, and in which said discharging means includes a spray coated cone top feedway at the discharge station, a stripper head disposed radially over the turret at the discharge station and including grooved and laterally spaced arms between which each cup moves upon presentation at said discharge station with edge portions of the carried cone top engaging in the arm grooves, means for lifting the arms to strip the cone top from the presented cup, means for positively holding each spindle from the cup on which a cone top is being stripped against movement with the stripper arms, and a finger reciprocable back and forth between the arms and engageable with cone tops stripped from presented cups and supported in the arm grooves for moving them onto said feedway.

34. A machine as defined in claim 1 in which said discharging means includes a spray coated cone top feedway at said discharging station, stripper means for stripping spray coated cone tops from the carrier and including spaced reciprocable elements which are grooved to receive edge portions of cone tops moved into said discharging station, a reciprocable member movable between the grooved elements for transferring cone tops therefrom onto the feedway, and a reciprocable feeder for moving the cone tops along the feedway.

35. A machine as defined in claim 1 in which said discharging means includes a spray coated cone top feedway at said discharging station, stripper means for stripping spray coated cone tops from the carrier and including spaced reciprocable elements which are grooved to receive edge portions of cone tops moved into said discharging station, a reciprocable member movable between the grooved elements for transferring cone tops therefrom onto the feedway, a reciprocable feeder for moving the cone tops along the feedway, means for reciprocating the reciprocable feeder, and means connecting the reciprocable transfer member with the reciprocating feeder for movement in timed relation therewith.

36. In a machine of the character described, a cone top supporting member, means for placing a cone top on said member, a spray member disposed to direct a coating spray onto a large diameter portion of a coniform surface of a cone top supported on the supporting member, means for rotating the supporting member and a cone top supported thereon, means for moving one of said members in the direction of the axis of the supported rotating cone top and at a rate gradually accelerated in degree corresponding to the graduality of the decrease in diameter of said coniform surface, thereby to gradually decrease the amount of applied spray accordingly as the area to be spray coated decreases and provide a spray coating of substantially uniform thickness throughout the coniform surface area to be spray coated, and means for removing a sprayed cone top from said supporting member.

37. In a machine of the character described, a cone top supporting member, means for placing a cone top on said member, a spray member disposed to direct a coating spray onto a coniform surface of a cone top supported on the supporting member, means for rotating the supporting member and a cone top supported thereon, means for moving one of said members in the direction of the axis of the supported rotating cone top and at a rate gradually changing reversely as the rate of change in diameter of said coniform surface gradually changes, thereby to provide a spray coating of substantially uniform thickness throughout the coniform surface area to be coated, and means for removing a sprayed cone top from said supporting member.

38. In a machine of the character described, a cone top supporting member, means for placing a cone top on said member, a spray member disposed to direct a coating spray onto a coniform surface of a cone top supported on the supporting member, means for rotating the supporting member and a cone top supported thereon, means for moving said supporting member and the rotating cone top thereon in the direction of the axis of the cone top and relative to the spray member and at a rate gradually changing reversely as the rate of change in diameter of said coniform surface gradually changes, thereby to provide a spray coating of substantially uniform thickness throughout the coniform surface area to be coated, and means for removing a sprayed cone top from said supporting member.

39. In a machine of the character described, a cone top supporting member, means for placing a cone top on said member, a spray member disposed to direct a coating spray onto a large diameter portion of a coniform surface of a cone top supported on the supporting member, means for rotating the supporting member and a cone top supported thereon, means for moving said supporting member and the rotating cone top thereon in the direction of the axis of the cone top and relative to the spray member and at a rate gradually accelerated in degree corresponding to the graduality of the decrease in diameter of said coniform surface, thereby to gradually decrease the amount of applied spray accordingly as the area to be spray coated decreases and provide a spray coating of substantially uniform thickness throughout the coniform surface area to be spray coated, and means for removing a sprayed cone top from said supporting member.

40. In a machine of the character described, a cone top supporting member, a spray member disposed to direct a coating spray onto a coniform surface of a cone top supported on the supporting member, means for rotating the supporting member and a cone top supported thereon, and means for moving one of said members in the direction of the axis of the supported rotating cone top and at a rate gradually changing reversely as the rate of change in diameter of said coniform surface gradually changes, thereby to provide a spray coating of substantially uniform thickness throughout the coniform surface area to be coated.

PAUL E. PEARSON.
ALFRED TREFF.